(12) United States Patent
Akah et al.

(10) Patent No.: US 11,820,948 B1
(45) Date of Patent: Nov. 21, 2023

(54) IMPREGNATED HIERARCHICAL MESOPOROUS ZSM-5 ZEOLITE CATALYSTS FOR STEAM ENHANCED CATALYTIC CRACKING OF CRUDE OIL TO PETROCHEMICALS

(71) Applicant: Saudi Arabian Oil Company, Dhahran (SA)

(72) Inventors: Aaron Chi Akah, Dhahran (SA); Veera Venkata Ramakrishna Tammana, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/956,342

(22) Filed: Sep. 29, 2022

(51) Int. Cl.
*C10G 11/05* (2006.01)
*C10G 11/20* (2006.01)
(Continued)

(52) U.S. Cl.
CPC ............. *C10G 11/05* (2013.01); *B01J 29/405* (2013.01); *B01J 29/46* (2013.01); *B01J 37/0201* (2013.01);
(Continued)

(58) Field of Classification Search
CPC .. C10G 11/05; C10G 11/20; C10G 2300/202; C10G 2300/205; C10G 2300/301;
(Continued)

(56) References Cited

U.S. PATENT DOCUMENTS

| 7,344,695 | B2 | 3/2008 | Xu et al. |
| 10,350,585 | B1 | 7/2019 | Al-Herz et al. |
| 2008/0214882 | A1 | 9/2008 | Pinnavaia et al. |

FOREIGN PATENT DOCUMENTS

| CN | 112138712 A | 12/2020 |
| CN | 114715911 A | * 7/2022 |

(Continued)

OTHER PUBLICATIONS

Al-Jlil et al., "Saudi Arabian clays for lead removal in wastewater", Applied Clay Science, vol. 42, pp. 671-674, 2009.
Ghrib et al., "Synthesis of cocrystallized USY/ZSM-5 zeolites from kaolin and its use in Fluid Catalytic Cracking catalysts", The Royal Society of Chemistry, vol. 00, pp. 1-3, 2013.
Haiyan et al., "In-situ Synthesis and Catalytic Properties of ZSM-5/Rectorite Composites as Propylene Boosting Additive in Fluid Catalytic Cracking Process", Chinese Journal of Chemical Engineering, vol. 20, No. 1, pp. 158-166, 2012.
(Continued)

*Primary Examiner* — Randy Boyer
*Assistant Examiner* — Juan C Valencia
(74) *Attorney, Agent, or Firm* — DINSMORE & SHOHL LLP

(57) ABSTRACT

A process for upgrading crude oil through steam enhanced catalytic cracking includes contacting crude oil with steam and a cracking catalyst at a mass ratio of steam to crude oil of 0.2-1. The cracking catalyst is a hierarchical mesoporous ZSM-5 zeolite impregnated with phosphorous, cerium, lanthanum, and iron. Contacting the crude oil with steam and the cracking catalyst cracks a portion of the crude oil to produce light olefins, light aromatic compounds, or both. The cracking catalyst is prepared by partially disintegrating a starting ZSM-5 zeolite in a first mixture comprising sodium hydroxide and a surfactant and, after the disintegrating, recrystallizing zeolite constituents in the presence of the surfactant to produce a recrystallized ZSM-5 zeolite having a hierarchical pore structure. The recrystallized ZSM-5 zeolite is recovered and calcined to produce the hierarchical mesoporous ZSM-5 zeolite, which is then impregnated with the phosphorous, lanthanum, cerium, and iron.

20 Claims, 8 Drawing Sheets

(51) Int. Cl.
  *B01J 29/46* (2006.01)
  *B01J 29/40* (2006.01)
  *B01J 37/16* (2006.01)
  *B01J 37/08* (2006.01)
  *B01J 37/02* (2006.01)

(52) U.S. Cl.
  CPC ............ *B01J 37/088* (2013.01); *B01J 37/16* (2013.01); *C10G 11/20* (2013.01); *C10G 2300/202* (2013.01); *C10G 2300/205* (2013.01); *C10G 2300/301* (2013.01); *C10G 2300/308* (2013.01); *C10G 2300/70* (2013.01); *C10G 2300/807* (2013.01)

(58) Field of Classification Search
  CPC .......... C10G 2300/308; C10G 2300/70; C10G 2300/807; B01J 29/405; B01J 29/46; B01J 37/0201; B01J 37/088; B01J 37/16
  See application file for complete search history.

(56) References Cited

FOREIGN PATENT DOCUMENTS

| | | |
|---|---|---|
| CN | 114715911 A | 7/2022 |
| WO | 2021126298 A1 | 6/2021 |

OTHER PUBLICATIONS

Hartanto et al., "Synthesis of ZSM-5 Directly from Kaolin without Organic Template: Part-1: Effect of Crystallization Time", Asian Journal of Chemistry, vol. 28, No. 1, pp. 211-215, 2016.

Hartati et al., "Preparation of Hierarchical ZSM-5 From Indonesian Kaolin by Adding Silica", Chemical Technology, vol. 10, No. 1, pp. 87-90, 2016.

Park et al., "Selective Petroleum Refining Over a Zeolite Catalyst with Small Intracrystal Mesopores", Angew. Chem. Int. Ed., 2009, vol. 48, pp. 7645-7648.

* cited by examiner

IMPREGNATED HIERARCHICAL MESOPOROUS ZSM-5 ZEOLITE CATALYSTS FOR STEAM ENHANCED CATALYTIC CRACKING OF CRUDE OIL TO PETROCHEMICALS

BACKGROUND

Field

The present disclosure relates to processes and catalysts for upgrading hydrocarbons to produce greater value petrochemical products and intermediates and, in particular, to processes and cracking catalyst compositions for catalytically cracking crude oil to produce olefins, aromatic compounds, or both.

Technical Background

The worldwide increasing demand for greater value petrochemical products and chemical intermediates remains a major challenge for many integrated refineries. In particular, the production of some valuable light olefins, such as ethylene and propylene, has attracted increased attention as pure olefin streams are considered the building blocks for polymer synthesis. Additionally, light aromatic compounds, such as benzene, toluene, and mixed xylenes can be useful as fuel blending constituents or can be converted to greater value chemical products and intermediates, which can be used as building blocks in chemical synthesis processes. Petrochemical feeds, such as crude oils, can be converted to petrochemicals, such as fuel blending components and chemical products and intermediates, such as light olefins and light aromatic compounds, which are basic intermediates for a large portion of the petrochemical industry. Crude oil is conventionally processed by distillation followed by various reforming, solvent treatments, and hydroconversion processes to produce a desired slate of fuels, lubricating oil products, chemicals, chemical feedstocks, and the like. Conventional refinery systems generally combine multiple complex refinery units with petrochemical plants to produce greater value petrochemical products and intermediates.

SUMMARY

Accordingly, there is an ongoing need for cracking catalysts and processes for steam enhanced catalytic cracking of crude oil feeds and other hydrocarbon feeds to produce greater yields of light olefins, light aromatic compounds, or both directly from crude oil with fewer processing steps. The present disclosure is directed to cracking catalysts comprising a hierarchical mesoporous ZSM-5 zeolite that may be impregnated with phosphorous and transition metal compounds, such as cerium oxide, lanthanum oxide, iron oxide, or combinations of these transition metal compounds. The present disclosure is also directed to process for upgrading hydrocarbon feeds, such as but not limited to crude oil, through steam enhanced catalytic cracking using the cracking catalysts. The cracking catalysts of the present disclosure may be capable of producing an increased yield of light olefin products directly from crude oil through steam enhanced catalytic cracking, when compared to conventional cracking catalyst compositions. The processes of the present disclosure may enable the direct conversion of crude oil to light olefins, light aromatic compounds, or both with fewer processing steps and unit operation compared to conventional refinery systems.

According to at least one aspect of the present disclosure, a process for upgrading crude oil through steam enhanced catalytic cracking may include contacting the crude oil with steam in the presence of a cracking catalyst, where the cracking catalyst may comprise a hierarchical mesoporous ZSM-5 zeolite impregnated with phosphorous, cerium, lanthanum, and iron. A mass ratio of steam to crude oil is from 0.2 to less than 1. The contacting of the crude oil with steam in the presence of the cracking catalyst may cause at least a portion of crude oil to undergo cracking reactions to produce a cracked effluent comprising light olefins, light aromatic compounds, or both.

According to at least one other aspect of the present disclosure, a cracking catalyst for steam enhanced catalytic cracking of hydrocarbons may include a hierarchical mesoporous ZSM-5 zeolite impregnated with phosphorous, cerium, lanthanum, and iron. The cracking catalyst may be prepared by a method comprising providing a starting preformed ZSM-5 zeolite; disintegrating a portion of the starting preformed ZSM-5 zeolite in a first mixture comprising sodium hydroxide and a surfactant; after the at least partially disintegrating the starting preformed ZSM-5 zeolite, recrystallizing zeolite constituents in the presence of the surfactant to produce a recrystallized ZSM-5 zeolite having a hierarchical pore structure; recovering the recrystallized ZSM-5 zeolite; calcining the recrystallized ZSM-5 zeolite, where the calcining removes the surfactant from the recrystallized ZSM-5 zeolite to produce the hierarchical mesoporous ZSM-5 zeolite; and impregnating the hierarchical mesoporous ZSM-5 zeolite with phosphorous, cerium, lanthanum, and iron to form the cracking catalyst.

Additional features and advantages of the aspects of the present disclosure will be set forth in the detailed description that follows and, in part, will be readily apparent to a person of ordinary skill in the art from the detailed description or recognized by practicing the aspects of the present disclosure.

BRIEF DESCRIPTION OF THE DRAWINGS

The following detailed description of the present disclosure may be better understood when read in conjunction with the following drawings in which.

Figure 1:
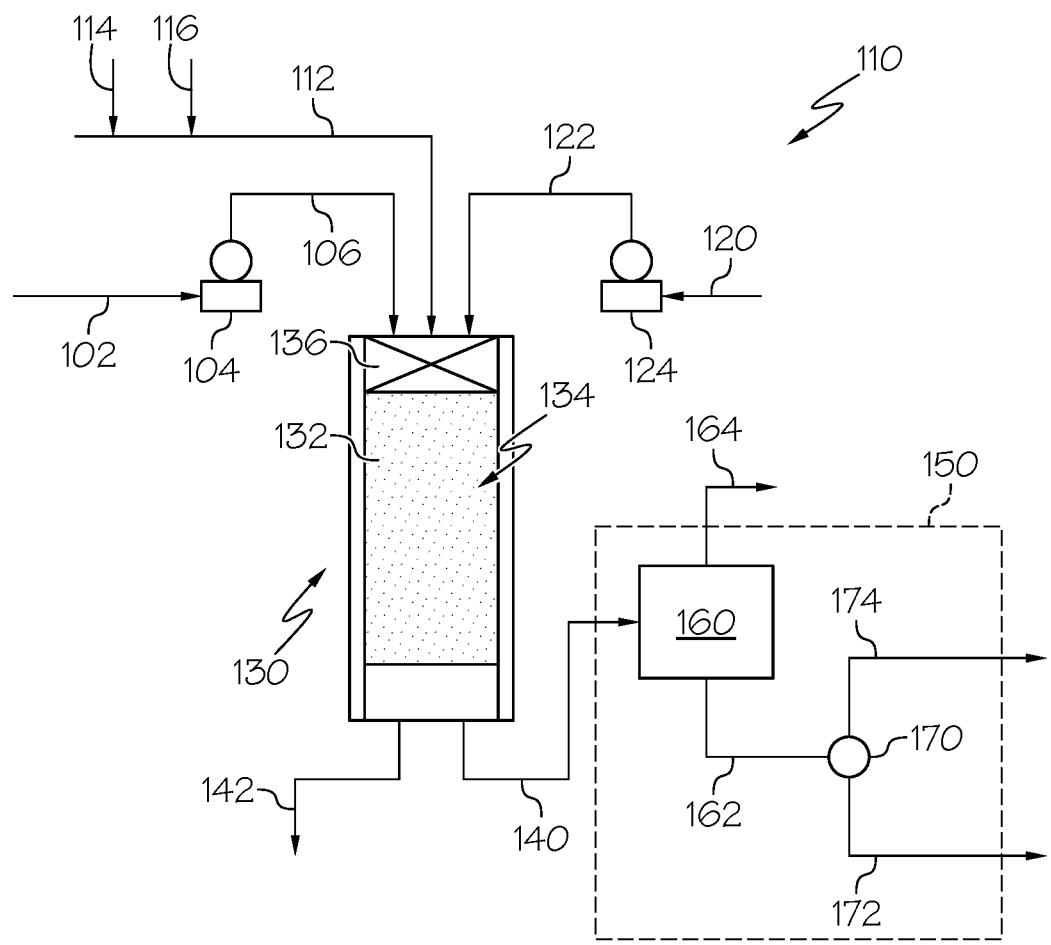
FIG. 1 schematically depicts a generalized flow diagram of a fixed bed reactor system for steam catalytic cracking of hydrocarbons to produce light olefins, light aromatic compounds, or both, according to one or more embodiments shown and described in the present disclosure.

When describing the simplified schematic illustrations of FIGS. 1, 3, 4, and 7, the numerous valves, temperature sensors, electronic controllers, and the like, which may be used and are well known to a person of ordinary skill in the art, may not be depicted. Further, accompanying components that are often included in systems such as those depicted in FIGS. 1, 3, 4, and 7, such as air supplies, heat exchangers, surge tanks, and the like, also may not be depicted. However, a person of ordinary skill in the art understands that these components are within the scope of the present disclosure.

Additionally, the arrows in the simplified schematic illustrations of FIGS. 1, 3, 4, and 7 refer to process streams. However, the arrows may equivalently refer to transfer lines, which may transfer process streams between two or more system components. Arrows that connect to one or more system components signify inlets or outlets in the given system components and arrows that connect to only one system component signify a system outlet stream that exits the depicted system or a system inlet stream that enters the depicted system. The arrow direction generally corresponds with the major direction of movement of the process stream or the process stream contained within the physical transfer line signified by the arrow.

The arrows in the simplified schematic illustrations of FIGS. 1, 3, 4, and 7 may also refer to process steps of transporting a process stream from one system component to another system component. For example, an arrow from a first system component pointing to a second system component may signify "passing" a process stream from the first system component to the second system component, which may comprise the process stream "exiting" or being "removed" from the first system component and "introducing" or "feeding" the process stream to the second system component.

Reference will now be made in greater detail to various aspects, some of which are illustrated in the accompanying drawings.

DETAILED DESCRIPTION

The present disclosure is directed to cracking catalysts and processes for upgrading hydrocarbon feeds, such as but not limited to crude oil, through enhanced catalytic cracking to produce greater yields of petrochemical products or intermediates, such as but not limited to light olefins, light aromatic compounds, or both. In particular, the present disclosure is directed to cracking catalysts that may include a hierarchical mesoporous ZSM-5 zeolite impregnated with phosphorous, cerium, lanthanum, and iron and methods of preparing the cracking catalyst. The cracking catalyst may be prepared by preparing the hierarchical mesoporous ZSM-5 zeolite and then impregnating the hierarchical mesoporous ZSM-5 zeolite with the phosphorous, cerium, lanthanum, and iron. The hierarchical mesoporous ZSM-5 zeolite may be produced by providing a starting ZSM-5 zeolite, disintegrating at least a portion of the starting ZSM-5 zeolite in the presence of a surfactant, then recrystallizing the zeolite constituents in the presence of the surfactant to produce a recrystallized ZSM-5 zeolite, recovering the recrystallized ZSM-5 zeolite, and calcining the recrystallized ZSM-5 zeolite to remove the surfactant and produce the hierarchical mesoporous ZSM-5 zeolite having the hierarchical pore structure comprising both micropores and mesopores.

A process of the present disclosure for upgrading a hydrocarbon feed through steam enhanced catalytic cracking may include contacting the hydrocarbon feed with steam in the presence of the cracking catalyst at reaction conditions sufficient to cause at least a portion of hydrocarbons in the hydrocarbon feed to undergo one or more cracking reactions to produce a cracking effluent comprising light olefins, light aromatic compounds, or both. The cracking catalyst may comprise the hierarchical mesoporous ZSM-5 zeolite impregnated with phosphorous, cerium, lanthanum, and iron. The process and cracking catalyst may enable the direct conversion of crude oil and other heavy oils to greater value petrochemical products and intermediates, such as but not limited to light olefins, light aromatic compounds, or both, through steam enhanced catalytic cracking. In particular, the cracking catalysts may increase the yield of light olefins and light aromatic compounds from steam enhanced catalytic cracking of crude oil compared to conventional cracking catalysts. The cracking catalysts of the present disclosure may have high hydrothermal stability and longer activity compared to conventional zeolite-based cracking catalysts.

As used in the present disclosure, the term "cracking" refers to a chemical reaction where a molecule having carbon-carbon bonds is broken into more than one molecule by the breaking of one or more of the carbon-carbon bonds. As used in the present disclosure, the term "catalytic cracking" refers to cracking conducted in the presence of a catalyst.

As used in the present disclosure, the term "catalyst" refers to any substance that increases the rate of a specific chemical reaction, such as but not limited to cracking reactions.

As used in the present disclosure, the term "used catalyst" refers to catalyst that has been contacted with reactants at reaction conditions, but has not been regenerated in a regenerator. The "used catalyst" may have coke deposited on the catalyst and may include partially coked catalyst as well as fully coked catalysts. The amount of coke deposited on the "used catalyst" may be greater than the amount of coke remaining on the regenerated catalyst following regeneration. The "used catalyst" may also include catalyst that has a reduced temperature due to contact with the reactants compared to the catalyst prior to contact with the reactants.

As used in the present disclosure, the term "regenerated catalyst" refers to catalyst that has been contacted with reactants at reaction conditions and then regenerated in a regenerator to heat the catalyst to a greater temperature, oxidize and remove at least a portion of the coke or other organic contaminants from the catalyst to restore at least a portion of the catalytic activity of the catalyst, or both. The "regenerated catalyst" may have less coke or organic contaminants, a greater temperature, or both, compared to used catalyst and may have greater catalytic activity compared to used catalyst. The "regenerated catalyst" may have more coke and lesser catalytic activity compared to fresh catalyst that has not been contacted with reactants in a reaction zone and then regenerated.

As used throughout the present disclosure, the term "light olefins" refers to olefinic compounds having less than or equal to 6 carbon atoms.

As used throughout the present disclosure, the term "light aromatic compounds" refers to compounds having an aromatic ring structure and having less than or equal to 10 carbon atoms.

As used throughout the present disclosure, the terms "butenes" or "mixed butenes" are used interchangeably and refer to combinations of one or a plurality of isobutene, 1-butene, trans-2-butene, or cis-2-butene. As used throughout the present disclosure, the term "normal butenes" refers to a combination of one or a plurality of 1-butene, trans-2-butene, or cis-2-butene. As used throughout the present disclosure, the term "2-butenes" refers to trans-2-butene, cis-2-butene, or a combinations of these.

As used in this disclosure, the term "initial boiling point" or "IBP" of a composition refers to the temperature at which the constituents of the composition with the lowest boiling point temperature begin to transition from the liquid phase to the vapor phase. As used in this disclosure, the term "end boiling point" or "EBP" of a composition refers to the temperature at which the greatest boiling temperature constituents of the composition transition from the liquid phase to the vapor phase. A hydrocarbon mixture may be characterized by a distillation profile expressed as boiling point temperatures at which a specific weight percentage of the composition has transitioned from the liquid phase to the vapor phase.

As used in this disclosure, the term "atmospheric boiling point temperature" refers to the boiling point temperature of a compound at atmospheric pressure.

As used in this disclosure, the term "crude oil" or "whole crude oil" is to be understood to mean a mixture of petroleum liquids, gases, or combinations of liquids and gases, including, in some embodiments, impurities such as but not limited to sulfur-containing compounds, nitrogen-containing compounds, and metal compounds, that have not undergone significant separation or reaction processes. Crude oils are distinguished from fractions of crude oil. In certain embodiments, the crude oil feedstock may be a minimally treated light crude oil to provide a crude oil feedstock having total metals (Ni+V) content of less than 5 parts per million by weight (ppmw) and Conradson carbon residue of less than 5 wt. %.

As used in the present disclosure, the term "directly" refers to the passing of materials, such as an effluent, from a first component of a processing system to a second component of the processing system without passing the materials through any intervening components or unit operations operable to change the composition of the materials. Similarly, the term "directly" also refers to the introducing of materials, such as a feed, to a component of the process system without passing the materials through any preliminary components operable to change the composition of the materials. Intervening or preliminary components or systems operable to change the composition of the materials include reactors and separators, but are not generally intended to include heat exchangers, valves, pumps, sensors, or other ancillary components required for operation of a chemical process.

As used in the present disclosure, the terms "downstream" and "upstream" refer to the positioning of components or unit operations of the processing system relative to a direction of flow of materials through the processing system. For example, a second component is considered "downstream" of a first component if materials flowing through the processing system encounter the first component before encountering the second component. Likewise, the first component is considered "upstream" of the second component if the materials flowing through the processing system encounter the first component before encountering the second component.

As used in the present disclosure, the term "effluent" refers to a stream that is passed out of a reactor, a reaction zone, or a separator following a particular reaction or separation. Generally, an effluent has a different composition than the stream that entered the reactor, reaction zone, or separator. It should be understood that when an effluent is passed to another component or system, only a portion of that effluent may be passed. For example, a slipstream may carry some of the effluent away, meaning that only a portion of the effluent may enter the downstream component or system. The terms "reaction effluent" and "reactor effluent" particularly refer to a stream that is passed out of a reactor or reaction zone.

The term "residence time" refers to the amount of time that reactants are in contact with a catalyst, at reaction conditions, such as at the reaction temperature.

As used in the present disclosure, the term "reactor" refers to any vessel, container, conduit, or the like, in which one or more chemical reactions, such as but not limited catalytic cracking reactions, may occur between one or more reactants optionally in the presence of one or more catalysts. One or more "reaction zones" may be disposed within a reactor. The term "reaction zone" refers to a volume where a particular chemical reaction takes place in a reactor.

As used in the present disclosure, the terms "separation unit" and "separator" refer to any separation device(s) that at least partially separates one or more chemical constituents in a mixture from one another. For example, a separation system selectively separates different chemical constituents from one another, forming one or more chemical fractions. Examples of separation systems include, without limitation, distillation columns, fractionators, flash drums, flash columns, knock-out drums, knock-out pots, centrifuges, decanters, filtration devices, traps, scrubbers, expansion devices, membranes, solvent extraction devices, adsorption devices, chemical separators, crystallizers, chromatographs, precipitators, evaporators, driers, high-pressure separators, low-pressure separators, or combinations or these. The separation processes described in the present disclosure may not completely separate all of one chemical constituent from all of another chemical constituent. Instead, the separation processes described in the present disclosure "at least partially" separate different chemical constituents from one another and, even if not explicitly stated, separation can include only partial separation.

It should further be understood that streams may be named for the components of the stream, and the component for which the stream is named may be the major component of the stream (such as the component comprising the greatest fraction of the stream, excluding diluent gases, such as nitrogen, noble gases, and the like, unless otherwise stated). It should also be understood that components of a stream are disclosed as passing from one system component to another when a stream comprising that component is disclosed as passing from that system component to another. For example, a disclosed "nitrogen stream" passing to a first system component or from a first system component to a second system component should be understood to equivalently disclose "nitrogen" passing to the first system component or passing from a first system component to a second system component.

Conventional refinery systems include multiple unit operations. Steam enhanced catalytic cracking of crude oil directly can reduce the complexity of the refining process, such as by reducing the number of unit operations needed to process the crude oil to produce greater value petrochemical products and intermediates, such as but not limited to light olefins and light aromatic compounds. Steam enhanced catalytic cracking processes typically utilize zeolites, such as ZSM-5 zeolites, which typically have a microporous pore structure having average pore size of less than 2 nanometers (nm). However, when cracking crude oil directly, crude oil can include a substantial amount of large molecules, such as up to 30 wt. % hydrocarbons having boiling point temperatures greater than or equal to 500° C. These large hydrocarbon molecules are not generally accessible to reactive sites in a conventional microporous ZSM-5 zeolite. Large molecules in crude oil can also plug the pores in the conventional ZSM-5 zeolite, which can reduce the effectiveness of the conventional ZSM-5 zeolites for steam enhanced catalytic cracking of crude oil and other hydrocarbon feeds.

The present disclosure is directed to steam catalytic cracking of crude oil using a cracking catalyst to convert the crude oil to greater value hydrocarbon products, such as but not limited to light olefins, aromatic compounds, or combinations of these. The cracking catalyst comprises a hierarchical mesoporous ZSM-5 zeolite that is impregnated with phosphorous, cerium, lanthanum, and iron. The metals cerium, lanthanum, and iron may be present in the cracking catalyst as the metal oxides. The hierarchical mesoporous ZSM-5 zeolite in the cracking catalyst of the present disclosure may have a microporous structure characteristic of ZSM-5 zeolites and also can have mesopores large enough to increase access to reactive sites and to reduce blockage of the reaction sites by large molecules from the crude oil. The present disclosure is also directed to the cracking catalyst and methods of making the cracking catalyst.

Referring now to FIG. 1, a process 100 of the present disclosure for converting a hydrocarbon feed 102 to light olefins, light aromatic compounds, or both, includes contacting the hydrocarbon feed 102 with steam in the presence of a cracking catalyst 132 at reaction conditions sufficient to cause at least a portion of hydrocarbons in the hydrocarbon feed 102 to undergo one or more cracking reactions to produce a steam catalytic cracking effluent 140 comprising light olefins, light aromatic compounds, or both, where the cracking catalyst 132 comprises a hierarchical mesoporous ZSM-5 zeolite impregnated with phosphorous, cerium oxide, lanthanum oxide, and iron oxide.

The hydrocarbon feed 102 may include one or more heavy oils, such as but not limited to crude oil, bitumen, oil sand, shale oil, coal liquids, vacuum residue, tar sands, other heavy oil streams, or combinations of these. It should be understood that, as used in this disclosure, a "heavy oil" refers to a raw hydrocarbon, such as whole crude oil, which has not been previously processed through distillation, or may refer to a hydrocarbon oil, which has undergone some degree of processing, such as but not limited to desalting, prior to being introduced to the process 100 as the hydrocarbon feed 102. The hydrocarbon feed 12 may have a density of greater than or equal to 0.80 grams per milliliter. The hydrocarbon feed 12 may have an end boiling point (EBP) of greater than 565° C. The hydrocarbon feed 12 may have a concentration of nitrogen of less than or equal to 3000 parts per million by weight (ppmw).

In embodiments, the hydrocarbon feed 102 may be a crude oil, such as whole crude oil, a synthetic crude oil, or a mixture of both. The crude oil may have an American Petroleum Institute (API) gravity of from 22 degrees to 50 degrees, such as from 22 degrees to 40 degrees, from 25 degrees to 50 degrees, or from 25 degrees to 40 degrees. For example, the hydrocarbon feed 102 may include an extra light crude oil, a light crude oil, a heavy crude oil, or combinations of these. In embodiments, the hydrocarbon feed 102 can be a light crude oil, such as but not limited to an Arab light export crude oil. Example properties for an exemplary grade of Arab light crude oil are provided in Table 1.

TABLE 1

Example of Arab Light Export Feedstock

| Analysis | Units | Value | Test Method |
|---|---|---|---|
| American Petroleum Institute (API) gravity | degree | 33.13 | ASTM D287 |
| Density | grams per milliliter (g/mL) | 0.8595 | ASTM D287 |
| Carbon Content | weight percent (wt. %) | 85.29 | ASTM D5291 |
| Hydrogen Content | wt. % | 12.68 | ASTM D5292 |
| Sulfur Content | wt. % | 1.94 | ASTM D5453 |
| Nitrogen Content | parts per million by weight (ppmw) | 849 | ASTM D4629 |
| Asphaltenes | wt. % | 1.2 | ASTM D6560 |
| Micro Carbon Residue (MCR) | wt. % | 3.4 | ASTM D4530 |
| Vanadium (V) Content | ppmw | 15 | IP 501 |
| Nickel (Ni) Content | ppmw | 12 | IP 501 |
| Arsenic (As) Content | ppmw | 0.04 | IP 501 |
| Boiling Point Distribution | | | |
| Initial Boiling Point (IBP) | Degrees Celsius (° C.) | 33 | ASTM D7169 |
| 5% Boiling Point (BP) | ° C. | 92 | ASTM D7169 |
| 10% BP | ° C. | 133 | ASTM D7169 |
| 20% BP | ° C. | 192 | ASTM D7169 |
| 30% BP | ° C. | 251 | ASTM D7169 |
| 40% BP | ° C. | 310 | ASTM D7169 |
| 50% BP | ° C. | 369 | ASTM D7169 |
| 60% BP | ° C. | 432 | ASTM D7169 |
| 70% BP | ° C. | 503 | ASTM D7169 |
| 80% BP | ° C. | 592 | ASTM D7169 |
| 90% BP | ° C. | >720 | ASTM D7169 |
| 95% BP | ° C. | >720 | ASTM D7169 |
| End Boiling Point (EBP) | ° C. | >720 | ASTM D7169 |
| BP range C5-180° C. | wt. % | 18.0 | ASTM D7169 |
| BP range 180 ° C.-350° C. | wt. % | 28.8 | ASTM D7169 |
| BP range 350° C.-540° C. | wt. % | 27.4 | ASTM D7169 |
| BP range >540° C. | wt. % | 25.8 | ASTM D7169 |

Weight percentages in Table 1 are based on the total weight of the crude oil.

In embodiments, the hydrocarbon feed 102 may be an Arab Extra Light (AXL) crude oil. An example boiling point distribution for an exemplary grade of an AXL crude oil is provided in Table 2.

TABLE 2

| Property | Units | Value | Test Method |
|---|---|---|---|
| 0.1% Boiling Point (BP) | ° C. | 21 | ASTM D7169 |
| 5% BP | ° C. | 65 | ASTM D7169 |
| 10% BP | ° C. | 96 | ASTM D7169 |
| 15% BP | ° C. | 117 | ASTM D7169 |
| 20% BP | ° C. | 141 | ASTM D7169 |

TABLE 2-continued

| Property | Units | Value | Test Method |
|---|---|---|---|
| 25% BP | °C. | 159 | ASTM D7169 |
| 30% BP | °C. | 175 | ASTM D7169 |
| 35% BP | °C. | 196 | ASTM D7169 |
| 40% BP | °C. | 216 | ASTM D7169 |
| 45% BP | °C. | 239 | ASTM D7169 |
| 50% BP | °C. | 263 | ASTM D7169 |
| 55% BP | °C. | 285 | ASTM D7169 |
| 60% BP | °C. | 308 | ASTM D7169 |
| 65% BP | °C. | 331 | ASTM D7169 |
| 70% BP | °C. | 357 | ASTM D7169 |
| 75% BP | °C. | 384 | ASTM D7169 |
| 80% BP | °C. | 415 | ASTM D7169 |
| 85% BP | °C. | 447 | ASTM D7169 |
| 90% BP | °C. | 486 | ASTM D7169 |
| 95% BP | °C. | 537 | ASTM D7169 |
| End Boiling Point (EBP) | °C. | 618 | ASTM D7169 |

When the hydrocarbon feed 102 comprises a crude oil, the crude oil may be a whole crude or may be a crude oil that has undergone at some processing, such as desalting, solids separation, scrubbing, or other preliminary processing that does not involve separation of the crude oil into different boiling range fraction. For example, the hydrocarbon feed 102 may be a de-salted crude oil that has been subjected to a de-salting process. In embodiments, the hydrocarbon feed 102 may include a crude oil that has not undergone pre-treatment, separation (such as distillation), or other operation or process that changes the hydrocarbon composition of the crude oil prior to introducing the crude oil to the system 100.

In embodiments, the hydrocarbon feed 102 can be a crude oil having a boiling point profile as described by the 5 wt. % boiling temperature, the 25 wt. % boiling temperature, the 50 wt. % boiling temperature, the 75 wt. % boiling temperature, and the 95 wt. % boiling temperature. These respective boiling temperatures correspond to the temperatures at which a given weight percentage of the hydrocarbon feed stream boils (transitions from liquid phase to vapor phase). In embodiments, the crude oil may have one or more of a 5 wt. % boiling temperature of less than or equal to 150° C.; a 25 wt. % boiling temperature of less than or equal to 225° C. or less than or equal to 200° C.; a 50 wt. % boiling temperature of less than or equal to 500° C., less than or equal 450° C., or less than or equal to 400° C.; a 75 wt. % boiling temperature of less than 600° C., less than or equal to 550° C.; a 95 wt. % boiling temperature of greater than or equal to 550° C. or greater than or equal to 600° C.; or combinations of these. In embodiments, the crude oil may have one or more of a 5 wt. % boiling temperature of from 0° C. to 100° C.; a 25 wt. % boiling temperature of from 150° C. to 250° C., a 50 wt. % boiling temperature of from 250° C. to 400° C., a 75 wt. % boiling temperature of from 350° C. to 600° C. and an end boiling point temperature of from 500° C. to 1000° C., such as from 500° C. to 800° C.

Referring again to FIG. 1, one embodiment of a steam catalytic cracking system 110 for steam catalytic cracking a hydrocarbon feed 102 is schematically depicted. The steam catalytic cracking system 110 may include at least one steam catalytic cracking reactor 130. The steam catalytic cracking reactor 130 may include one or more fixed bed reactors, fluid bed reactors, batch reactors, fluid catalytic cracking (FCC) reactors, moving bed catalytic cracking reactors, or combinations of these. In embodiments, the steam catalytic cracking reactor 130 may be a fixed bed reactor. In embodiments, the steam catalytic cracking reactor 130 may include a plurality of fixed bed reactors operated in a swing mode. Operation of the steam catalytic cracking reactor 130 will be described herein in the context of a fixed bed reactor. However, it is understood that other types of reactors, such as a fluid bed reactors, batch reactors, FCC reactors, or moving bed reactors, may also be used to contact the hydrocarbon feed 102 with the cracking catalyst to conduct the steam enhanced catalytic cracking of the process disclosed herein.

The steam catalytic cracking reactor 130 may operate to contact the hydrocarbon feed 102 with steam in the presence of the cracking catalyst of the present disclosure to produce a steam cracking effluent comprising light olefins, aromatic compounds, or combinations of these. As previously discussed, the steam catalytic cracking reactor 130 may be a fixed bed catalytic cracking reactor that may include the cracking catalyst 132 disposed within a steam catalytic cracking zone 134. The steam catalytic cracking reactor 130 may include a porous packing material 136, such as silica carbide packing, upstream of the steam catalytic cracking zone 134. The porous packing material 136 may ensure sufficient heat transfer to the hydrocarbon feed 102 and steam prior to conducting the steam catalytic cracking reaction in the steam catalytic cracking zone 134.

Referring again to FIG. 1, the hydrocarbon feed 102 may be introduced to the steam catalytic cracking reactor 130. In embodiments, the hydrocarbon feed 102 may be introduced directly to the steam catalytic cracking system 110, such as by passing the crude oil of the hydrocarbon feed 102 to the steam catalytic cracking reactor 130 without passing the hydrocarbon feed 102 to any separation system or unit operation that changes the hydrocarbon composition of the hydrocarbon feed 102. In embodiments, the hydrocarbon feed 102 may be processed upstream of the steam catalytic cracking system 110 to remove contaminants, such as but not limited to nitrogen compounds, sulfur-containing compounds, heavy metals, or other contaminants that may reduce the effectiveness of the cracking catalyst 132.

Introducing the hydrocarbon feed 102 to the steam catalytic cracking reactor 130 may include heating the hydrocarbon feed 102 to a temperature of from 35° C. to 150° C. and then passing the hydrocarbon feed 102 to the steam catalytic cracking reactor 130. In embodiments, the hydrocarbon feed 102 may be pre-heated to a temperature of from 40° C. to 150° C., from 45° C. to 150° C., from 50° C. to 150° C., from 35° C. to 145° C., from 40° C. to 145° C., from 45° C. to 145° C., from 35° C. to 140° C., from 40° C. to 140° C., or from 45° C. to 140° C.

In embodiments, passing the hydrocarbon feed 102 to the steam catalytic cracking reactor 130 may include passing the hydrocarbon feed 102 to a feed pump 104, where the feed pump 104 may increase the pressure of the hydrocarbon feed 102 and convey the hydrocarbon feed 102 to the steam catalytic cracking reactor 130. The flowrate of the feed pump 104 may be adjusted so that the hydrocarbon feed 102 is injected into the steam catalytic cracking reactor 130 at a gas hourly space velocity of greater than or equal to 0.1 per hour ($h^{-1}$) or greater than or equal to 0.25 $h^{-1}$. The hydrocarbon feed 102 may be injected into the steam catalytic cracking reactor 130 at a gas hourly space velocity of less than or equal to 50 $h^{-1}$, less than or equal to 25 $h^{-1}$, less than or equal to 20 $h^{-1}$, less than or equal to 14 $h^{-1}$, less than or equal to 9 $h^{-1}$, or less than or equal to 5 $h^{-1}$. The hydrocarbon feed 102 may be injected into the steam catalytic cracking reactor 130 at a gas hourly space velocity of from 0.1 $h^{-1}$ to 50 $h^{-1}$, from 0.1 $h^{-1}$ to 25 $h^{-1}$, from 0.1 $h^{-1}$ to 20 $h^{-1}$, from 0.1 $h^{-1}$ to 14 $h^{-1}$, from 0.1 $h^{-1}$ to 9 $h^{-1}$, from 0.1 $h^{-1}$ to 5 $h^{-1}$, from 0.1 $h^{-1}$ to 4 $h^{-1}$, from 0.25 $h^{-1}$ to 50 $h^{-1}$, from 0.25 h$^{-1}$ to 25 h$^{-1}$, from 0.25 h$^{-1}$ to 20 h$^{-1}$, from 0.25 h$^{-1}$ to 14 h$^{-1}$, from 0.25 h$^{-1}$ to 9 h$^{-1}$, from 0.25 h$^{-1}$ to 5 h$^{-1}$, from 0.25 h$^{-1}$ to 4 h$^{-1}$ from 1 h$^{-1}$ to 50 h$^{-1}$ from 1 h$^{-1}$ to 25 h$^{-1}$ from 1 h$^{-1}$ to 20 h$^{-1}$, from 1 h$^{-1}$ to 14 h$^{-1}$, from 1 h$^{-1}$ to 9 h$^{-1}$, or from 1 h$^{-1}$ to 5 h$^{-1}$ via feed inlet line 106. The hydrocarbon feed 102 may be further pre-heated in the feed inlet line 106 to a temperature of from 100° C. to 250° C. before injecting the hydrocarbon feed 102 into the steam catalytic cracking reactor 130.

Water 120 may be injected into the steam catalytic cracking reactor 130 through water feed line 122 via the water feed pump 124. The water feed line 122 may be pre-heated to heat the water 120 to a temperature of from 50° C. to 175° C., from 50° C. to 150° C., from 60° C. to 175° C., or from 60° C. to 170° C. The water 120 may be converted to steam in water feed line 122 or upon contact with the hydrocarbon feed 102 in the steam catalytic cracking reactor 130. The flowrate of the water feed pump 124 may be adjusted to deliver the water 120 (liquid, steam, or both) to the steam catalytic cracking reactor 130 at a gas hourly space velocity of greater than or equal to 0.1 per hour (h$^{-1}$), greater than or equal to 0.5 h$^{-1}$, greater than or equal to 1 h$^{-1}$, greater than or equal to 5 h$^{-1}$, greater than or equal to 6 h$^{-1}$, greater than or equal to 10 h$^{-1}$, or even greater than or equal to 15 h$^{-1}$. The water 120 may be introduced to the steam catalytic cracking reactor 130 at a gas hourly space velocity of less than or equal to 100 h$^{-1}$, less than or equal to 75 h$^{-1}$, less than or equal to 50 h$^{-1}$, less than or equal to 30 h$^{-1}$, or less than or equal to 20 h$^{-1}$. The water 120 may be introduced to the steam catalytic cracking reactor 130 at a gas hourly space velocity of from 0.1 h$^{-1}$ to 100 h$^{-1}$ from 0.1 h$^{-1}$ to 75 h$^{-1}$ from 0.1 h$^{-1}$ to 50 h$^{-1}$ from 0.1 h$^{-1}$ to 30 h$^{-1}$ from 0.1 h$^{-1}$ to 20 h$^{-1}$, from 1 h$^{-1}$ to 100 h$^{-1}$, from 1 h$^{-1}$ to 75 h$^{-1}$, from 1 h$^{-1}$ to 50 h$^{-1}$, from 1 h$^{-1}$ to 30 h$^{-1}$, or from 1 h$^{-1}$ to 20 h$^{-1}$.

The steam produced from injection of the water 120 into the steam catalytic cracking reactor 130 may reduce the hydrocarbon partial pressure, which may have the dual effects of increasing yields of light olefins (e.g., ethylene, propylene and butylene) as well as reducing coke formation on the cracking catalyst. Not intending to be limited by any particular theory, it is believed that light olefins like propylene and mixed butenes are mainly generated from catalytic cracking reactions following the carbonium ion mechanism, and as these are intermediate products, they can undergo secondary reactions such as hydrogen transfer and aromatization (leading to coke formation). The steam may increase the yield of light olefins by suppressing these secondary bi-molecular reactions, and may reduce the concentration of reactants and products, which favor selectivity towards light olefins. The steam may also suppress secondary reactions that are responsible for coke formation on the catalyst surface, which is good for catalysts to maintain high average activation. These factors may show that a large steam-to-oil weight ratio may be beneficial to the production of light olefins.

The mass flow rate of the water 120 to the steam catalytic cracking reactor 130 may be less than the mass flow rate of the hydrocarbon feed 102 to the steam catalytic cracking reactor 130. In embodiments, a mass flow ratio of the water 120 (steam) to the hydrocarbon feed 102 introduced to the steam catalytic cracking reactor 130 can be less than 1, such as less than or equal to 0.9, less than or equal to 0.8, less than or equal to 0.7, or less than or equal to 0.6. In embodiments, the mass flow ratio of the water 120 to the hydrocarbon feed 102 introduced to the steam catalytic cracking reactor 130 can be from 0.2 to less than 1, from 0.2 to 0.9, from 0.2 to 0.8, from 0.2 to 0.7, from 0.2 to 0.6, from 0.3 to less than 1, from 0.3 to 0.9, from 0.3 to 0.8, from 0.3 to 0.7, from 0.3 to 0.6, from 0.4 to less than 1, from 0.4 to 0.9, from 0.4 to 0.8, from 0.4 to 0.7, from 0.4 to 0.6, from 0.5 to less than 1, from 0.5 to 0.9, from 0.5 to 0.8, from 0.5 to 0.7, from 0.5 to 0.6. In embodiments, the mass flow ratio of the water 120 to the hydrocarbon feed 102 introduced to the steam catalytic cracking reactor 130 can be about 0.5. The water may be present as steam in the steam catalytic cracking reactor 130.

Referring again to FIG. 1, the steam catalytic cracking system 110 may be operable to contact the hydrocarbon feed 102 with steam (from water 120) in the presence of the cracking catalyst 132 in the steam catalytic cracking reactor 130 under reaction conditions sufficient to cause at least a portion of the hydrocarbons from the hydrocarbon feed 102 to undergo one or more cracking reactions to produce a steam catalytic cracking effluent 140 comprising light olefins, light aromatic compounds, or both. In embodiments, the steam catalytic cracking effluent 140 may comprise light olefins, which may include but are not limited to ethylene, propylene, mixed butenes, or combinations of these. In embodiments, the steam catalytic cracking effluent 140 may comprise light aromatic compounds, which refers to compounds containing an aromatic ring structure and having less than or equal to 10 carbon atoms. The light aromatic compounds in the steam catalytic cracking effluent 140 may include but are not limited to benzene, toluene, ethylbenzene, mixed xylenes, or other light aromatic compounds.

The steam catalytic cracking reactor 130 may be operated at a temperature of greater than or equal to 525° C., greater than or equal to 550° C., greater than or equal to 575° C., or even greater than or equal to 600° C. The steam catalytic cracking reactor 130 may be operated at a temperature of less than or equal to 800° C., less than or equal to 750° C., less than or equal to 700° C., or even less than or equal to 675° C. The steam catalytic cracking reactor 130 may be operated at a temperature of from 525° C. to 800° C., from 525° C. to 750° C., from 525° C. to 700° C., from 525° C. to 675° C., from 550° C. to 750° C., from 550° C. to 700° C., from 550° C. to 675° C., from 575° C. to 750° C., from 575° C. to 700° C., from 575° C. to 675° C., from 600° C. to 750° C., from 600° C. to 700° C., or from 600° C. to 675° C. In embodiments, the steam catalytic cracking reactor 130 may be operated at a temperature of about 675° C. The process may operate at atmospheric pressure (approximately from 1 to 2 bar (100 kPa to 200 kPa)).

The methods of the present disclosure may include contacting the hydrocarbon feed 102 with the steam (water 120) in the presence of the cracking catalyst 132 in the steam catalytic cracking reactor 130 for a residence time sufficient to convert at least a portion of the hydrocarbon compounds in the hydrocarbon feed 102 to light olefins, light aromatic compounds, or both. In embodiments, the methods may include contacting the hydrocarbon feed 102 with the steam (water 120) in the presence of the cracking catalyst 132 in the steam catalytic cracking reactor 130 for a residence time of from 1 second to 60 seconds, such as from 5 seconds to 30 seconds, or about 10 seconds.

When the steam catalytic cracking reactor 130 is a fixed bed reactor, the steam catalytic cracking reactor 130 may be operated in a semi-continuous manner. For example, during a conversion cycle, the steam catalytic cracking reactor 130 may be operated with the hydrocarbon feed 102 and water 120 flowing to the steam catalytic cracking reactor 130 for a period of time. After the period of time, the cracking catalyst 132 may be regenerated. Each conversion cycle of the steam catalytic cracking reactor 130 may be from 2 to 24 hours, from 2 to 20 hours, from 2 to 16 hours, from 2 to 12 hours, from 2 to 10 hours, from 2 to 8 hours, from 4 to 24 hours, from 4 to 20 hours, from 4 to 16 hours, from 4 to 12 hours, from 4 to 10 hours, from or 4 to 8 hours before switching off the feed pump 104 and the water feed pump 124 to cease the flow of hydrocarbon and steam to the steam catalytic cracking reactor 130.

At the end of the conversion cycle, the flow of hydrocarbon feed 102 and water 120 may be stopped and the cracking catalyst 132 may be regenerated during a regeneration cycle. In embodiments, the steam catalytic cracking system 110 may include a plurality of fixed bed steam catalytic cracking reactors 130, which may be operated in parallel or in series. In embodiments, the steam catalytic cracking system 110 may include 2, 3, 4, 5, 6, or more than 6 steam catalytic cracking reactors 130, which may be operated in series or in parallel. With a plurality of steam catalytic cracking reactors 130 operating in parallel, one or more of the steam catalytic cracking reactors 130 can continue in a conversion cycle while one or more of the other steam catalytic cracking reactors 130 are taken off-line for regeneration of the cracking catalyst 132, thus maintaining continuous operation of the steam catalytic cracking system 110.

Referring again to FIG. 1, during a regeneration cycle, the steam catalytic cracking reactor 130 may be operated to regenerate the cracking catalyst 132. The cracking catalyst 132 may be regenerated to remove coke deposits accumulated during the conversion cycle. To regenerate the cracking catalyst 132, hydrocarbon gas and liquid products produced by the steam catalytic cracking process may be evacuated from the steam catalytic cracking reactor 130. Nitrogen gas 114 may be introduced to the steam catalytic cracking reactor 130 through gas inlet line 112 to evacuate the hydrocarbon gas and liquid products from the fixed bed steam catalytic cracking reactor 130. The nitrogen gas 114 may be introduced to the steam catalytic cracking reactor 130 at gas hourly space velocity of from 10 per hour ($h^{-1}$) to 100 $h^{-1}$.

Following evacuation of the hydrocarbon gases and liquids, air 116 may be introduced to the steam catalytic cracking reactor 130 through the gas inlet line 112 at a gas hourly space velocity of from 10 $h^{-1}$ to 100 $h^{-1}$. The air may be passed out of the steam catalytic cracking reactor 130 through air outlet line 142. While passing air 116 through the cracking catalyst 132 in the steam catalytic cracking reactor 130, the temperature of the steam catalytic cracking reactor 130 may be adjusted from the reaction temperature to a regeneration temperature of from 650° C. to 750° C. for a period of from 3 hours to 5 hours. The gas produced by air regeneration of the cracking catalyst 132 may be passed out of the steam catalytic cracking reactor 130 and may be analyzed by an in-line gas analyzer to detect the presence or concentration of carbon dioxide produced through de-coking of the cracking catalyst 132. Once the carbon dioxide concentration in the gases passing out of the steam catalytic cracking reactor 130 are reduced to less than 0.05% to 0.1% by weight, as determined by the in-line gas analyzer, the temperature of the steam catalytic cracking reactor 130 may be decreased from the regeneration temperature back to the reaction temperature. The air flow through gas inlet line 112 may be stopped. Nitrogen gas may be passed through the cracking catalyst 132 for 15 to 30 minutes to remove air from the steam catalytic cracking reactor 130. Following treatment with nitrogen, the flows of the hydrocarbon feed 102 and water 120 may be resumed to begin another conversion cycle of steam catalytic cracking reactor 130. Although described herein in the context of a fixed bed reactor system, it is understood that the steam catalytic cracking reactor 130 can be a different type of reactor, such as a fluidized bed reactor, a moving bed reactor, a batch reactor, an FCC reactor, or combinations of these.

Referring again to FIG. 1, the steam catalytic cracking effluent 140 may pass out of the steam catalytic cracking reactor 130. The steam catalytic cracking effluent 140 may include one or more products and intermediates, such as but not limited to light hydrocarbon gases, light olefins, aromatic compounds, pyrolysis oil, or combinations of these. The light olefins in the steam catalytic cracking effluent 140 may include ethylene, propylene, butenes, or combinations of these.

As previously discussed, the cracking catalyst comprises a hierarchical mesoporous ZSM-5 zeolite impregnated with phosphorous or a phosphorous-containing compound and one or more transition metal compounds, such as but not limited transition metals, transition metal oxides, or combinations of these. In particular, the cracking catalyst may comprise the hierarchical mesoporous ZSM-5 zeolite impregnated with phosphorous pentoxide, cerium oxide, lanthanum oxide, and iron oxide. The cracking catalyst may be prepared by a method that include preparing the hierarchical mesoporous ZSM-5 zeolite and then impregnating the hierarchical mesoporous ZSM-5 zeolite with the phosphorous-containing compounds and the transition metal compounds.

Figure 2:
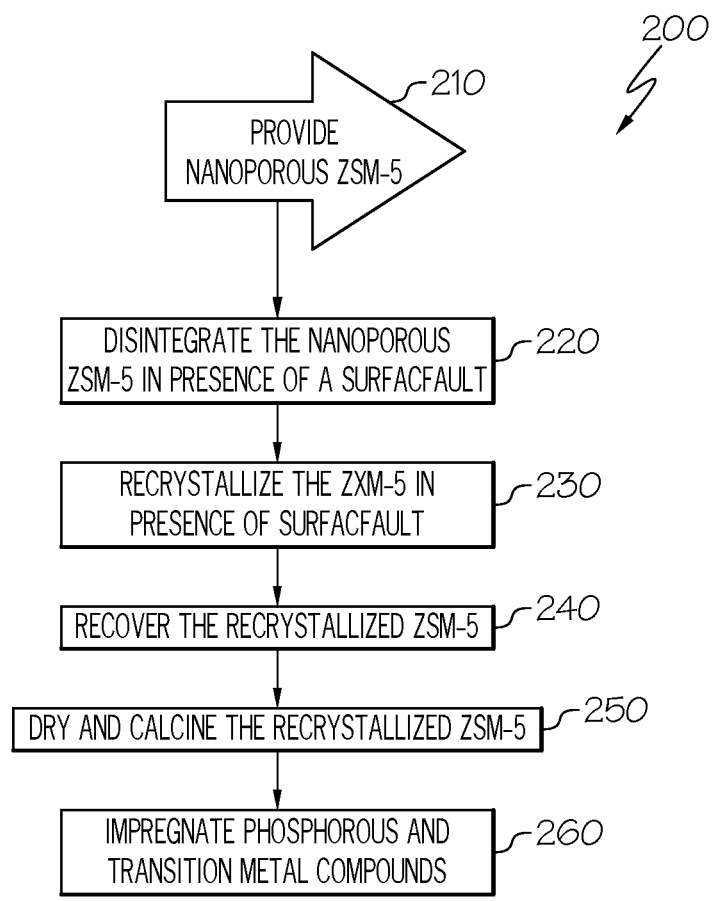
FIG. 2 depicts a flowchart of one embodiment of a method for producing a cracking catalyst, according to one or more embodiments shown and described in the present disclosure.

Referring now to FIG. 2, a method 200 for preparing the cracking catalyst is depicted. The method 200 may include preparing the hierarchical mesoporous ZSM-5 zeolite by providing a starting ZSM-5 zeolite, such as a microporous ZSM-5 zeolite, in step 210; disintegrating at least a portion of the starting ZSM-5 zeolite in a first mixture comprising the starting ZSM-5 zeolite, sodium hydroxide, and a surfactant, in step 220; after disintegrating at least a portion of the ZSM-5 zeolite, recrystallizing zeolite constituents in the presence of the surfactant to produce a recrystallized ZSM-5 zeolite in step 230; recovering the recrystallized ZSM-5 zeolite in step 240; and drying and calcining the recrystallized ZSM-5 zeolite in step 250. Calcining may remove the surfactant from the recrystallized ZSM-5 zeolite to produce the hierarchical mesoporous ZSM-5 zeolite having a hierarchical pore structure. The hierarchical pore structure of the hierarchical mesoporous ZSM-5 zeolite may include micropores and mesopores.

The starting ZSM-5 zeolite is a shape selective zeolite that can be active to catalytically-crack hydrocarbons to produce smaller hydrocarbon molecules, such as the light olefins, light aromatic compounds, or both. As used in the present disclosure, "ZSM-5" refers to zeolites having an MFI framework type according to the International Union of Pure and Applied Chemistry (IUPAC) zeolite nomenclature and consisting of silica and alumina. ZSM-5 refers to "Zeolite Socony Mobil-5" and is a pentasil family zeolite that can be represented by the chemical formula $Na_nAl_nSi_{96-n}O_{192} \cdot 16H_2O$, where 0<n<27. The starting ZSM-5 zeolite can have a microporous pore structure with an average pore size of less than or equal to 2 nm. The starting ZSM-5 zeolite can have a molar ratio of silica to alumina of greater than or equal to 10 or greater than or equal to 20. The starting ZSM-5 zeolite can have a molar ratio of silica to alumina of less than or equal to 300, such as less than or equal to 200, less than or equal to 100, or even less than or equal to 40. In embodiments, the starting ZSM-5 zeolite can have a molar ratio of silica to alumina of from 10 to 300, from 10 to 200, from 10 to 100, from 10 to 50, from 20 to 300, from 20 to 200, from 20 to 100, from 20 to 50, or from 50 to 300. The starting ZSM-5 zeolite can be in the form of a plurality of particles, such as a plurality of spherical particles. The starting ZSM-5 zeolite can be obtained from a commercial supplier or can be synthesized according to known methods of producing conventional microporous ZSM-5 zeolites.

The starting ZSM-5 zeolite may then subjected to a disintegration process to disintegrate at least a portion of the starting ZSM-5 zeolite. As used in the present disclosure, the term "disintegration" refers to breaking down the ZSM-5 framework structure into its constituent oxides, such as alumina and silica, which are then dissolved into solution. Disintegrating at least a portion of the starting ZSM-5 zeolite may comprise first combining the starting ZSM-5 zeolite, the sodium hydroxide, and the surfactant to form the first mixture.

The first mixture may include a concentration of sodium hydroxide sufficient to breakdown the zeolite framework structure of portions of the starting ZSM-5 zeolite and dissolve the disintegrated alumina and silica into the first mixture. In embodiments, the first mixture may comprise a concentration of sodium hydroxide of from 0.2 molar (M) to 0.4 M. The surfactant may be cetyltrimethylammonium bromide (CTAB). The first mixture may include an amount of the surfactant sufficient to solubilize the constituents of the starting ZSM-5 zeolite following disintegration of those constituents and control formation of the mesopores during the recrystallization process. In embodiments, the first mixture can include a concentration of CTAB of from 4 wt. % to 5 wt. %, or 4.45 wt. %, based on the total weight of the first mixture. The first mixture may have a pH greater than 9, greater than or equal to 10, greater than or equal to 10.5, or even greater than or equal to 11. The pH may be from 9.5 to 14, from 9.5 to 13, from 9.5 to 12.5, from 9.5 to 12, from 10 to 14, from 10 to 13, from 10 to 12.5, from 10 to 12, from 10.5 to 14, from 10.5 to 13, from 10.5 to 12.5, from 10.5 to 12, from 11 to 14, from 11 to 13, from 11 to 12.5, or even from 11 to 12.

Disintegration may further comprise hydrothermally treating the first mixture, where hydrothermally treating the starting ZSM-5 zeolite in the presence of the sodium hydroxide and the surfactant causes the disintegration of portions of the starting ZSM-5 zeolite. Hydrothermally treating the first mixture may include heating the first mixture to a first hydrothermal treatment temperature of greater than or equal to 100° C., such as a temperature of from 100° C. to 150° C., while stirring the first mixture. Hydrothermally treating the first mixture may further include maintaining the first mixture under stirring at the temperature of greater than or equal to 100° C. or from 100° C. to 150° C. for a first hydrothermal treatment time. The first hydrothermal treatment time may be sufficient to disintegrate a portion but not all of the starting ZSM-5 zeolite. If the first hydrothermal treatment time to too long, all of the starting ZSM-5 zeolite may be disintegrated, which can make it difficult to initiate recrystallization of the zeolite constituents to form the hierarchical mesoporous ZSM-5 zeolite. If the first hydrothermal treatment time is too short, then insufficient disintegration of the ZSM-5 zeolite may lead to insufficient formation of mesopores in the hierarchical mesoporous ZSM-5 zeolite, which may limit the BET surface area and decrease the number of accessible reaction sites. In embodiments, the first hydrothermal treatment time may be from 10 hours to 30 hours, such as from 10 hours to 24 hours, from 14 hours to 30 hours from 14 hours to 24 hours, from 18 hours to 30 hours, from 18 hours to 24 hours, from 20 hours to 30 hours, or about 24 hours.

Following disintegration of at least a portion of the starting ZSM-5 zeolite in the first mixture, the alumina and silica constituents disintegrated and dissolved into the first mixture may then be recrystallized in the presence of the surfactant to produce the hierarchical pore structure of the hierarchical mesoporous ZSM-5 zeolite of the present disclosure. Recrystallization of the alumina and silica constituents disintegrated from the starting ZSM-5 zeolite in the presence of the surfactant can enable the creation of the mesoporous structure while retaining the same silica to alumina molar ratio as the starting ZSM-5 zeolite.

Recrystallizing the alumina and silica constituents that have been disintegrated from the starting ZSM-5 zeolite may include cooling the first mixture back to room temperature. Cooling the first mixture may include cooling the first mixture to a temperature of from 20° C. to 50° C., such as to a temperature of 25° C. After cooling, the recrystallizing may include adjusting the pH of the first mixture to a pH of 9.0 to produce a second mixture. The pH may be adjusted by adding a strong acid, such as but not limited to sulfuric acid. In embodiments, the strong acid may be added to the first mixture dropwise until the pH reaches 9.0. In embodiments, the pH can be adjusting with 2N sulfuric acid. The second mixture comprises the portions of the ZSM-5 zeolite particles not disintegrated, the surfactant, and the silica and alumina species disintegrated and dissolved into the second mixture.

After adjusting the pH, recrystallizing the ZSM-5 constituents may include stirring the second mixture for a second time period of from 10 hours to 30 hours, from 10 hours to 24 hours, from 14 hours to 30 hours from 14 hours to 24 hours, from 18 hours to 30 hours, from 18 hours to 24 hours, from 20 hours to 30 hours, or about 24 hours, and then hydrothermally treating the second mixture. Hydrothermally treating the second mixture can include heating the second mixture to a second hydrothermal treatment temperature of greater than or equal to 100° C., such as from 100° C. to 150° C., and maintaining the second mixture at the second hydrothermal treatment temperature under stirring for a third time period. The third time period may be sufficient to recrystallize the silica and alumina constituents of the ZSM-5 zeolite in the presence of the surfactant to produce the recrystallized ZSM-5 zeolite having a mesoporous structure to the recrystallized portion. In embodiments, the third time period can be from 10 hours to 30 hours, from 10 hours to 24 hours, from 14 hours to 30 hours from 14 hours to 24 hours, from 18 hours to 30 hours, from 18 hours to 24 hours, from 20 hours to 30 hours, or about 24 hours. Stirring the second mixture for the second time period and hydrothermally treating the second mixture for the third time period recrystallizes the alumina and silica constituents in the presence of the surfactant to produce the recrystallized ZSM-5 zeolite. In particular, during recrystallization, the alumina and silica constituents in the second mixture may recrystallize in the presence of the surfactant to form a layer of ZSM-5 zeolite having a hierarchical porous structure onto the outer surfaces of the non-disintegrated portions of the starting ZSM-5 zeolite. The hierarchical porous structure of the layer of ZSM-5 zeolite recrystallized on the surfaces of the non-disintegrated portion of the starting ZSM-5 zeolite can include mesopores and micropores.

Following recrystallization, producing the hierarchical mesoporous ZSM-5 zeolite may include recovering the recrystallized ZSM-5 zeolite. Recovering the recrystallized ZSM-5 zeolite may include separating the recrystallized ZSM-5 zeolite particles from the second mixture, such as but not limited to filtering the second mixture to produce a filtrate comprising the recrystallized ZSM-5 zeolite particles. Other solid-liquid separation processes can be used in addition to or in place of filtration. Following separation of the recrystallized ZSM-5 zeolite particles from the second mixture, the recrystallized ZSM-5 zeolite particles can be washed with water, such as distilled water or deionized water, to remove residual reagents of the second mixture from the surfaces and pores of the recrystallized ZSM-5 particles. After washing, recrystallized ZSM-5 zeolite particles can be dried at a drying temperature of 80° C. for a drying period of from 8 hours to 24 hours to produce a recrystallized ZSM-5 zeolite powder. The recrystallized ZSM-5 zeolite powder may then be calcined at a temperature of from 500° C. to 800° C. for a calcination period of from 5 hours to 24 hours to produce the hierarchical mesoporous ZSM-5 zeolite having the hierarchical pore structure.

In embodiments, the hierarchical mesoporous ZSM-5 zeolite can be ion-exchanged to produce the hydrogen form of the hierarchical mesoporous ZSM-5 zeolite. In hydrogen form, the Brønsted acid sites in the zeolite, also known as bridging OH—H groups, may form hydrogen bonds with other framework oxygen atoms in the zeolite framework. In embodiments, the method of producing the hierarchical mesoporous ZSM-5 zeolite may include ion-exchanging the hierarchical mesoporous ZSM-5 zeolite to produce the hydrogen form of the hierarchical mesoporous ZSM-5 zeolite. In embodiments, ion-exchanging the hierarchical mesoporous ZSM-5 zeolite may include treating the hierarchical mesoporous ZSM-5 zeolite with 0.25 normal (N) ammonium nitrate at 80° C. for 5 hours. In embodiments, the ion-exchanging process may be conducted a plurality of times, such as by treating the hierarchical mesoporous ZSM-5 zeolite with 0.25 N ammonium nitrate two times or more than two times at 80° C. for 5 hours each time. In embodiments, the hierarchical mesoporous ZSM-5 zeolite may be in hydrogen form.

The hierarchical mesoporous ZSM-5 zeolite can have a molar ratio of silica to alumina of greater than or equal to 10 or greater than or equal to 20. The hierarchical mesoporous ZSM-5 zeolite can have a molar ratio of silica to alumina of less than or equal to 300, such as less than or equal to 200, less than or equal to 100, or even less than or equal to 40. In embodiments, the hierarchical mesoporous ZSM-5 zeolite can have a molar ratio of silica to alumina of from 10 to 300, such as from 10 to 200, from 10 to 100, from 10 to 50, from 20 to 300, from 20 to 200, from 20 to 100, from 20 to 50, or from 50 to 300. In embodiments, the hierarchical mesoporous ZSM-5 zeolite can have a molar ratio of silica to alumina that is the same as the molar ratio of silica to alumina of the starting ZSM-5 zeolite.

The hierarchical mesoporous ZSM-5 zeolite may be in the form of a plurality of particles. In embodiments, the hierarchical mesoporous ZSM-5 zeolite may have an average crystal size of greater than or equal to 50 nm, greater than or equal to 100 nm, or even greater than or equal to 200 nm. The hierarchical mesoporous ZSM-5 zeolite may have an average crystal size of less than or equal to 600 nm or less than or equal to 500 nm. In embodiments, the hierarchical mesoporous ZSM-5 zeolite may have an average crystal size of from 50 nm to 600 nm, from 50 nm to 500 nm, from 100 nm to 600 nm, from 100 nm to 500 nm, from 200 nm to 600 nm, or from 200 nm to 500 nm. The average crystal size is determined by scanning electron microscopy (SEM) according to known methods.

As previously discussed, the hierarchical mesoporous ZSM-5 zeolite of the cracking catalyst of the present disclosure has a hierarchical pore structure comprising mesopores and micropores. Not intending to be limited by any particular theory, it is believed that the presence of the mesopores created by the surfactant assisted disintegration and recrystallization may produce a mesoporous structure that can increase the adsorption of larger hydrocarbon molecules from the hydrocarbon feed 102 into the zeolite pore structure, leading to enhanced conversion. The presence of mesopores in the crystalline framework of the hierarchical mesoporous ZSM-5 zeolites may be considered to be equivalent to increasing its external surface area, making a larger number of pore openings accessible to larger reactants, such as greater molecular weight hydrocarbon molecules. The mesopores may act as highways to facilitate molecular transport to and from the micropores, which harbor the active reaction sites. The creation of the mesopores in the hierarchical mesoporout ZSM-5 zeolite may also shorten the diffusion path length in the micropores leading to an improved transport and thus a more efficient use of ZSM-5 as a catalyst. The shortened diffusion path length means that target products, like light olefins, may be less susceptible to secondary reactions like hydrogenation or oligomerization. Increased molecular transport within the hierarchical mesoporous ZSM-5 zeolite of the present disclosure may reduce the probability of pore mouth coke formation and may increases the lifetime of the catalyst. The pore mouth coke formation is believed to be a result of clogging of heavy aromatics compounds form the hydrocarbon feed 102, which are restricted from entering into surface pores of microporous zeolites zeolite at higher temperatures.

In embodiments, the hierarchical mesoporous ZSM-5 zeolite may have a specific surface area of from 550 $m^2$/g to 600 $m^2$/g, such as about 572 $m^2$/g, prior to impregnation with the phosphorous and transition metal compounds. The specific surface area is determined according to the Brunauer-Emmett-Teller (BET) method. The specific surface area may be referred to throughout the present disclosure as the BET surface area. The BET surface area of the hierarchical mesoporous ZSM-5 zeolite can include the BET surface area provided by the mesoporous structure and the BET surface area provided by the microporous structure. The BET surface area provided by the mesopores is referred to throughout the present disclosure as the mesoporous BET surface area, which represents the surface area of internal surfaces of mesopores of the hierarchical mesoporous ZSM-5 zeolite as determined by the BET method. The BET surface area provided by the micropores is referred to throughout the present disclosure as the microporous BET surface area, which represents the surface area of internal surface of micropores of the hierarchical mesoporous ZSM-5 zeolite as determined by the BET method.

The hierarchical mesoporous ZSM-5 zeolite may have a mesoporous BET surface area that is greater than a microporous BET surface area of the hierarchical mesoporous ZSM-5 zeolite. In embodiments, the mesoporous BET surface area of the hierarchical mesoporous ZSM-5 zeolite may be greater than 50% of the total BET surface area of the hierarchical mesoporous ZSM-5 zeolite, such as greater than or equal to 52%, or even greater than or equal to 55% of the total BET surface area of the hierarchical mesoporous ZSM-5 zeolite. In embodiments, the mesoporous BET surface area of the hierarchical mesoporous ZSM-5 zeolite may be from 50% to 80%, from 50% to 75%, from 50% to 70%, from 50% to 65%, from 50% to 60%, from 52% to 80%, from 52% to 75%, from 52% to 70%, from 52% to 65%, from 52% to 60%, from 55% to 80%, from 55% to 75%, from 55% to 70%, from 55% to 65%, or from 55% to 60% of the total BET surface area of the hierarchical mesoporous ZSM-5 zeolite. The balance of the total BET surface area can be the microporous BET surface area. In embodiments, the hierarchical mesoporous ZSM-5 zeolite may have a mesoporous BET surface area of from 300 m²/g to 400 m²/g, or about 325 m²/g prior to impregnation with the phosphorous and transition metal compounds.

The hierarchical mesoporous ZSM-5 zeolite may have a total pore volume of from 0.40 centimeter squared per gram (cm³/g) to 0.50 cm³/g, or about 0.45 cm³/g prior to impregnation with the phosphorous and transition metal compounds. The total pore volume is determined from measured gas adsorption isotherms through Non-Local Density Functional Theory (NLDFT) modeling and analysis. The BET method is also used to determine the total pore volume. The total pore volume of the hierarchical mesoporous ZSM-5 zeolite includes the pore volume provided by the mesopores and the pore volume provided by the micropores. The pore volume provided by the mesopores is referred to throughout the present disclosure as the mesopore volume, and the pore volume provided by the micropores is referred to throughout the present disclosure as the micropore volume.

The hierarchical mesoporous ZSM-5 zeolite may have a mesopore volume that is greater than a micropore volume of the hierarchical mesoporous ZSM-5 zeolite. In embodiments, the mesopore volume of the hierarchical mesoporous ZSM-5 zeolite may be greater than 50% of the total pore volume of the hierarchical mesoporous ZSM-5 zeolite, such as greater than or equal to 60%, greater than or equal to 65%, or about 67% of the total pore volume of the hierarchical mesoporous ZSM-5 zeolite. In embodiments, the mesopore volume of the hierarchical mesoporous ZSM-5 zeolite may be from 60% to 80%, from 60% to 75%, from 60% to 70%, from 65% to 80%, from 65% to 75%, from 65% to 70%, from 67% to 80%, or from 67% to 75% of the total pore volume of the hierarchical mesoporous ZSM-5 zeolite. The remainder of the total pore volume may be the micropore volume. In embodiments, the hierarchical mesoporous ZSM-5 zeolite may have a mesopore volume of from 0.25 cm³/g to 0.35 cm³/g, from 0.30 cm³/g to 0.35 cm³/g, or about 0.31 cm³/g prior to impregnation with the phosphorous and transition metal compounds.

Referring again to FIG. 2, following synthesis of the hierarchical mesoporous ZSM-5 zeolite, the method of making the cracking catalyst of the present disclosure may further include impregnating the hierarchical mesoporous ZSM-5 zeolite with phosphorous-containing compounds and transition metals transition metal compounds (step 260). As discussed, the cracking catalyst may further include phosphorous or phosphorous-containing compounds impregnated onto the outer surfaces and pore surfaces of the hierarchical mesoporous ZSM-5 zeolite. The phosphorous or phosphorous-containing compounds may be supported by the hierarchical mesoporous ZSM-5 zeolite. Including the phosphorous or phosphorous-containing compounds in the cracking catalyst can improve the thermal stability of the hierarchical mesoporous ZSM-5 zeolite. In embodiments, the phosphorous-containing compounds may include phosphorous pentoxide ($P_2O_5$). The phosphorous or phosphorous pentoxide may be disposed at or deposited on the outer surfaces, the pore surfaces, or both of the hierarchical mesoporous ZSM-5 zeolite so that the phosphorous or phosphorous pentoxide is accessible to reactants that come into contact with the cracking catalyst or diffuse into the pores of the cracking catalyst. The phosphorous or phosphorous pentoxide can be deposited on the hierarchical mesoporous ZSM-5 zeolite through known methods, such as but not limited to wet impregnation methods, incipient wetness impregnation methods, or other impregnation methods.

The cracking catalyst can include an amount of the phosphorous-containing compounds, such as phosphorous pentoxide, sufficient to improve the thermal stability of the cracking catalyst. In embodiments, the cracking catalyst may comprise from 1 wt. % to 5 wt. % phosphorous-containing compounds, such as but not limited to phosphorus pentoxide, based on the total weight of the cracking catalyst. In embodiments, the cracking catalyst may comprise from 1 wt. % to 4.5 wt. %, from 1 wt. % to 4 wt. %, from 1 wt. % to 3.5 wt. %, from 1 wt. % to 3 wt. %, from 1 wt. % to 2.5 wt. %, from 1 wt. % to 2 wt. %, from 1 wt. % to 1.5 wt. %, from 1.5 wt. % to 5 wt. %, from 2 wt. % to 5 wt. %, from 2.5 wt. % to 5 wt. %, from 3 wt. % to 5 wt. %, from 3.5 wt. % to 5 wt. %, from 4 wt. % to 5 wt. %, from 4.5 wt. % to 5 wt. %, from 1.5 wt. % to 4.5 wt. %, from 2 wt. % to 4 wt. %, or from 2.5 wt. % to 4 wt. % phosphorous-containing compounds based on the total weight of the cracking catalyst.

In embodiments, the cracking catalyst may comprise one or a plurality of transition metals, transition metal oxides, or both impregnated onto the surfaces of the hierarchical mesoporous ZSM-5 zeolite. As previously discussed, the phosphorous or phosphorous-containing compounds may improve the thermal stability of the cracking catalyst. However, the presence of the phosphorous can reduce the acidity of the acidic reactive sites in the hierarchical mesoporous zeolite, which can reduce the reactivity of the reactive sites. The transition metals, transition metal oxides, or both can be impregnated onto the hierarchical mesoporous ZSM-5 zeolite to improve the reactivity of the cracking catalyst to compensate for the presence of the phosphorous.

The transition metal, transition metal oxide, or both may include one or more metal elements from periods 4-6 of the IUPAC periodic table. In embodiments, the transition metal, transition metal oxides, or both may include one or more metal elements selected from the group consisting of gallium (Ga), zinc (Zn), chromium (Cr), manganese (Mn), platinum (Pt), iron (Fe), molybdenum (Mo), lanthanum (La), cerium (Ce), and combinations thereof. In embodiments, the cracking catalyst can comprise cerium metal, cerium oxide(s), lanthanum metal, lanthanum oxide(s), iron metal, iron oxide(s), or a combination of these impregnated onto the outer surfaces and pore surfaces of the hierarchical mesoporous ZSM-5 zeolite. In embodiments, the cracking catalyst may include cerium oxide, lanthanum oxide, and iron oxide impregnated onto the outer surfaces of the hierarchical mesoporous ZSM-5 zeolite. The transition metals, transition metal oxides, or both may be supported by the hierarchical mesoporous ZSM-5 zeolite. The transition metals, transition metal oxides, or both may be disposed on the outer surfaces, the pore surfaces, or both of the hierarchical mesoporous ZSM-5 zeolite so that the transition metal, transition metal oxide, or both are accessible to reactants that contact the cracking catalyst or diffuse into the pores of the cracking catalyst. The transition metals, transition metal oxides, or both may be impregnated or deposited onto the hierarchical mesoporous ZSM-5 zeolite according to known methods, such as but not limited to wet impregnation methods, incipient wetness impregnation methods, or other impregnation methods.

The cracking catalyst can include an amount of the transition metal, transition metal oxide, or both sufficient to promote the production of light olefins during steam enhanced catalytic cracking. In embodiments, the cracking catalyst may comprise from 0.01 wt. % to 30 wt. % of the transition metal, transition metal oxides, or both based on the total weight of the cracking catalyst. In embodiments, the cracking catalyst may comprises from 0.01 wt. % to 25 wt. %, from 0.01 wt. % to 20 wt. %, from 0.01 wt. % to 15 wt. %, from 0.01 wt. % to 10 wt. %, from 0.01 wt. % to 5 wt. %, from 0.01 wt. % to 3 wt. %, from 0.1 wt. % to 30 wt. %, from 0.1 wt. % to 25 wt. %, from 0.1 wt. % to 20 wt. %, from 0.1 wt. % to 15 wt. %, from 0.1 wt. % to 10 wt. %, from 0.1 wt. % to 5 wt. %, from 0.1 wt. % to 3 wt. %, from 1 wt. % to 30 wt. %, from 1 wt. % to 25 wt. %, from 1 wt. % to 20 wt. %, from 1 wt. % to 15 wt. %, from 1 wt. % to 10 wt. %, from 1 wt. % to 5 wt. %, or from 1 wt. % to 3 wt. % of the transition metal, transition metal oxide, or both based on the total weight of the cracking catalyst.

In embodiments, the cracking catalyst may comprise cerium oxides impregnated onto the hierarchical mesoporous ZSM-5 zeolite. The cracking catalyst may include from 0.01 wt. % to 20 wt. % cerium oxides based on the total weight of the cracking catalyst. In embodiments, the cracking catalyst may include from 0.01 wt. % to 15 wt. %, from 0.01 wt. % to 10 wt. %, from 0.01 wt. % to 5 wt. %, from 0.01 wt. % to 1 wt. %, from 0.1 wt. % to 20 wt. %, from 0.1 wt. % to 15 wt. %, from 0.1 wt. % to 10 wt. %, from 0.1 wt. % to 5 wt. %, from 0.1 wt. % to 1 wt. %, from 1 wt. % to 20 wt. %, from 1 wt. % to 15 wt. %, from 1 wt. % to 10 wt. %, or from 1 wt. % to 5 wt. % of the cerium oxides based on the total weight of the cracking catalyst.

In embodiments, the cracking catalyst may comprise lanthanum oxides impregnated onto the hierarchical mesoporous ZSM-5 zeolite. The cracking catalyst may include from 0.01 wt. % to 20 wt. % lanthanum oxides based on the total weight of the cracking catalyst. In embodiments, the cracking catalyst may include from 0.01 wt. % to 15 wt. %, from 0.01 wt. % to 10 wt. %, from 0.01 wt. % to 5 wt. %, from 0.01 wt. % to 1 wt. %, from 0.1 wt. % to 20 wt. %, from 0.1 wt. % to 15 wt. %, from 0.1 wt. % to 10 wt. %, from 0.1 wt. % to 5 wt. %, from 0.1 wt. % to 1 wt. %, from 1 wt. % to 20 wt. %, from 1 wt. % to 15 wt. %, from 1 wt. % to 10 wt. %, or from 1 wt. % to 5 wt. % of the lanthanum oxides based on the total weight of the cracking catalyst.

In embodiments, the cracking catalyst may comprise iron oxides impregnated onto the hierarchical mesoporous ZSM-5 zeolite. The cracking catalyst may include from 0.01 wt. % to 20 wt. % iron oxides based on the total weight of the cracking catalyst. In embodiments, the cracking catalyst may include from 0.01 wt. % to 15 wt. %, from 0.01 wt. % to 10 wt. %, from 0.01 wt. % to 5 wt. %, from 0.01 wt. % to 1 wt. %, from 0.1 wt. % to 20 wt. %, from 0.1 wt. % to 15 wt. %, from 0.1 wt. % to 10 wt. %, from 0.1 wt. % to 5 wt. %, from 0.1 wt. % to 1 wt. %, from 1 wt. % to 20 wt. %, from 1 wt. % to 15 wt. %, from 1 wt. % to 10 wt. %, or from 1 wt. % to 5 wt. % of the iron oxides based on the total weight of the cracking catalyst.

In embodiments, the cracking catalyst may comprise, consist of, or consist essentially of the hierarchical mesoporous ZSM-5 zeolite impregnated with from 1 wt. % to 5 wt. % phosphorous pentoxide, from 0.01 wt. % to 20 wt. % cerium oxide, from 0.01 wt. % to 20 wt. % lanthanum oxide, and from 0.01 wt. % to 20 wt. % iron oxide, where the weight percentages are based on the total weight of the cracking catalyst. In embodiments, the cracking catalyst may comprise, consist of, or consist essentially of the hierarchical mesoporous ZSM-5 zeolite impregnated with 3.5 wt. % phosphorous pentoxide, 1 wt. % cerium oxide, 1 wt. % lanthanum oxide, and 1 wt. % iron oxide, where the weight percentages are based on the total weight of the cracking catalyst.

In embodiments, the cracking catalyst be incorporated into composite catalyst particles comprising the hierarchical mesoporous ZSM-5 zeolite impregnated with phosphorous oxide and the transition metal oxides combined with one or more non-zeolitic inorganic materials and a matrix material and then formed into catalyst particles. The composite catalyst particles can include from 20 wt. % to 60 wt. % cracking catalyst (hierarchical mesoporous ZSM-5 zeolite impregnated with P, Ce, La, Fe) based on the total weight of the composite catalyst particles. In embodiments, the composite catalyst particles may comprise from 20 wt. % to 55 wt. %, from 20 wt. % to 50 wt. %, from 20 wt. % to 45 wt. %, from 20 wt. % to 40 wt. %, from 30 wt. % to 60 wt. %, from 30 wt. % to 55 wt. %, from 30 wt. % to 50 wt. %, from 30 wt. % to 45 wt. %, from 40 wt. % to 60 wt. %, from 40 wt. % to 55 wt. %, or from 40 wt. % to 50 wt. % cracking catalyst based on the total weight of the composite catalyst particles.

In embodiments, the composite catalyst particles can include non-zeolitic inorganic materials, such as but not limited to non-zeolitic inorganic binders, non-zeolitic fillers, or both. The composite catalyst particles can include from 15 wt. % to 60 wt. % non-zeolitic inorganic materials based on the total weight of the composite catalyst particles. In embodiments, the composite catalyst particles can comprise from 15 wt. % to 20 wt. %, from 15 wt. % to 30 wt. %, from 15 wt. % to 40 wt. %, from 15 wt. % to 50 wt. %, from 20 wt. % to 30 wt. %, from 20 wt. % to 40 wt. %, from 20 wt. % to 50 wt. %, from 20 wt. % to 60 wt. %, from 30 wt. % to 40 wt. %, from 30 wt. % to 50 wt. %, from 30 wt. % to 60 wt. %, from 40 wt. % to 50 wt. %, from 40 wt. % to 60 wt. %, or from 50 wt. % to 60 wt. % non-zeolitic inorganic materials based on the total weight of the composite catalyst particles.

The non-zeolitic inorganic materials can include silica-based materials or alumina-based materials. Non-zeolitic inorganic materials can include, but are not limited to, one or more of silica sol, water glass (sodium silicate), silicic acid liquid, basic aluminum chloride, aluminum biphosphate, alumina sol, activated alumina, porous silica, or combinations of these. In embodiments, the non-zeolitic inorganic materials can include non-zeolitic inorganic oxides such as but not limited to activated alumina, porous silica, rare-earth metal oxides, or combinations of these.

In embodiments, the non-zeolitic inorganic materials can include an alumina binder. One example of an alumina binder can include but is not limited to CATAPAL™ B alumina available from Sasol Chemicals. In embodiments, the composite catalyst particles can include a peptized alumina binder. The alumina binder can be peptized by forming a mixture comprising the alumina binder, water, and a peptizing agent, such as but not limited to formic acid, and stirring the mixture for a time period sufficient to produce the peptized alumina binder. In embodiments, the composite catalyst particles can include from 15 wt. % to 60 wt. % of the peptized alumina binder based on the total weight of the composite catalyst particles. In embodiments, the composite catalyst particles can comprise from 15 wt. % to 20 wt. %, from 15 wt. % to 30 wt. %, from 15 wt. % to 40 wt. %, from 15 wt. % to 50 wt. %, from 20 wt. % to 30 wt. %, from 20 wt. % to 40 wt. %, from 20 wt. % to 50 wt. %, from 20 wt. % to 60 wt. %, from 30 wt. % to 40 wt. %, from 30 wt. % to 50 wt. %, from 30 wt. % to 60 wt. %, from 40 wt. % to 50 wt. %, from 40 wt. % to 60 wt. %, or from 50 wt. % to 60 wt. % of the peptized alumina binder based on the total weight of the composite catalyst particles.

The composite catalyst particles can comprise one or more matrix materials. As used in this disclosure, "matrix materials" refers to a clay material such as kaolin, which are also non-zeolitic materials. Without being bound by theory, it is believed that the matrix materials of the composite catalyst particles can serve both physical and catalytic functions. Physical functions include providing particle integrity and attrition resistance, acting as a heat transfer medium, and providing a porous structure to allow diffusion of hydrocarbons into and out of the composite catalyst particles. The matrix material can also affect catalyst selectivity, product quality, and resistance to poisons. In embodiments, the matrix material comprises kaolin. As used in this disclosure, "kaolin" refers to a clay material that has a relatively large amount (such as at least about 50 wt. %, at least 60 wt. %, at least 70 wt. %, at least 80 wt. %, at least 90 wt. %, or even at least 95 wt. %) of kaolinite, which can be represented by the chemical formula $Al_2Si_2O_5(OH)_4$. In additional embodiments, the matrix material may comprise other clay materials.

The composite catalyst particles comprising the cracking catalyst can include one or more matrix materials in an amount of from 20 wt. % to 60 wt. % based on the total weight of the composite catalyst particles. In embodiments, the composite catalyst particles can comprise from 20 wt. % to 55 wt. %, from 20 wt. % to 50 wt. %, from 20 wt. % to 45 wt. %, from 20 wt. % to 40 wt. %, from 30 wt. % to 60 wt. %, from 30 wt. % to 55 wt. %, from 30 wt. % to 50 wt. %, from 30 wt. % to 45 wt. %, from 40 wt. % to 60 wt. %, or from 40 wt. % to 50 wt. % matrix material based on the total weight of the composite catalyst particles. In embodiments, the composite catalyst particles can include any single disclosed matrix material in an amount of the disclosed weight percentage ranges. In embodiments, the composite catalyst particles can include any two or more matrix materials in combination in an amount of the disclosed weight percentage ranges.

The composite catalyst particles can be prepared by preparing a slurry comprising water, matrix materials, non-zeolitic inorganic materials such as a peptized alumina binder, and the cracking catalyst comprising the hierarchical mesoporous ZSM-5 zeolite impregnated with phosphorous and transition metal oxides. The slurry can then be spray dried and calcined at a temperature of about 550° C. for about 6 hours to produce the composite catalyst particles. In embodiments, the composite catalyst particles may have an average particle size of from 20 micrometers to 100 micrometers.

As previously discussed, the cracking catalyst of the present disclosure or the composite catalyst particles comprising the cracking catalyst of the present disclosure can be used to convert hydrocarbons in crude oil to greater value petrochemical products and intermediates, such as light olefins, light aromatic compounds, or both, through steam enhanced catalytic cracking. Referring again to FIG. 1, the steam catalytic cracking effluent 140 produced through steam enhanced catalytic cracking may have an increased yield of light olefins, such as ethylene, propylene, and mixed butenes compared to effluents produced using conventional commercially available cracking catalysts.

Referring again to FIG. 1, the steam catalytic cracking system 110 may further include a cracking effluent separation system 150 disposed downstream of the steam catalytic cracking reactors 130. When the steam catalytic cracking system 110 includes a plurality of steam catalytic cracking reactors 130, the steam catalytic cracking effluents 140 from each of the steam catalytic cracking reactors 130 may be passed to a single shared cracking effluent separation system 150. In embodiments, each steam catalytic cracking reactor 130 may have its own dedicated cracking effluent separation system 130. The steam catalytic cracking effluent 140 may be passed from the steam catalytic cracking reactor 130 directly to the cracking effluent separation system 150. The cracking effluent separation system 150 may separate the steam catalytic cracking effluent 140 into one or more than one cracking product effluents, which may be liquid or gaseous product effluents.

Referring again to FIG. 1, the cracking effluent separation system 150 may include one or a plurality of separation units. Separation units may include but are not limited to distillation columns, fractionators, flash drums, knock-out drums, knock-out pots, centrifuges, decanters, filtration devices, traps, scrubbers, expansion devices, membranes, solvent extraction devices, adsorption devices, chemical separators, crystallizers, chromatographs, precipitators, evaporators, driers, high-pressure separators, low-pressure separators, or combinations or these. The separation units may include one or more gas-liquid separators, one or more liquid-liquid separators, or a combination of these.

In embodiments, the cracking effluent separation system 150 may include a gas-liquid separation unit 160 and a centrifuge unit 170 downstream of the gas-liquid separation unit 160. The gas-liquid separation unit 160 may operate to separate the steam catalytic cracking effluent 140 into a liquid effluent 162 and a gaseous effluent 164. The gas-liquid separation unit 160 may operate to reduce the temperature of the steam catalytic cracking effluent 140 to condense constituents of the steam catalytic cracking effluent 140 having greater than or equal to 5 carbon atoms. The gas-liquid separation unit 160 may operate at a temperature of from 10° C. to 15° C. to ensure that normal pentane and constituents with boiling point temperatures greater than normal pentane are condensed into the liquid effluent 162. The liquid effluent 162 may include distillation fractions such as naphtha, kerosene, gas oil, vacuum gas oil; unconverted feedstock; residue; water; or combinations of these. The liquid effluent 162 may include the light aromatic compounds produced in the steam catalytic cracking reactor 130, which light aromatic compounds may include but are not limited to benzene, toluene, mixed xylenes, ethylbenzene, and other light aromatic compounds. The liquid effluent 162 may include at least 95%, at least 98%, at least 99%, or even at least 99.5% of the hydrocarbon constituents of the steam catalytic cracking effluent 140 having greater than or equal to 5 carbon atoms. The liquid effluent 162 may include at least 95%, at least 98%, at least 99%, or even at least 99.5% of the water from of the steam catalytic cracking effluent 140. The liquid effluent 162 may be a two-phase stream comprising an oil phase and an aqueous phase immiscible with the oil phase.

The gaseous effluent 164 may include olefins, such as ethylene, propylene, butenes, or combinations of these; light hydrocarbon gases, such as methane, ethane, propane, n-butane, butane, or combinations of these; other gases, such as but not limited to hydrogen; or combinations of these. The gaseous effluent 164 may include the $C_2$-$C_4$ olefin products, such as but not limited to, ethylene, propylene, butenes (1-butene, cis-2-butene, trans-2-butene, isobutene, or combinations of these), or combinations of these, produced in the steam catalytic cracking reactor 130. The gaseous effluent 164 may include at least 90%, at least 95%, at least 98%, at least 99%, or at least 99.5% of the $C_2$-$C_4$ olefins from the steam catalytic cracking effluent 140. The gaseous effluent 164 may be passed to a downstream gas separation system (not shown) for further separation of the gaseous effluent 164 into various product streams, such as but not limited to one or more olefin product streams.

The liquid effluent 162 may be a two-phase stream comprising an oil phase and an aqueous phase immiscible with the oil phase. In embodiments, the liquid effluent 162, which includes the water and hydrocarbon having greater than 5 carbon atoms, may be passed to the in-line centrifuge unit 170. The in-line centrifuge unit 170 may operate to separate the liquid effluent 162 into a liquid hydrocarbon effluent 172 and an aqueous effluent 174. The in-line centrifuge unit 170 may be operated at a rotational speed of from 2500 rpm to 5000 rpm, from 2500 rpm to 4500 rpm, from 2500 rpm to 4000 rpm, from 3000 rpm to 5000 rpm, from 3000 rpm to 4500 rpm, or from 3000 rpm to 4000 rpm to separate the hydrocarbon phase from the aqueous phase.

The liquid hydrocarbon effluent 172 may include hydrocarbons from the steam catalytic cracking effluent 140 having greater than or equal to 5 carbon atoms. The liquid hydrocarbon effluent 172 may include the light aromatic compounds produced in the steam catalytic cracking reactor 130, which light aromatic compounds may include but are not limited to benzene, toluene, mixed xylenes, ethylbenzene, and other light aromatic compounds. The liquid hydrocarbon effluent 172 may further include naphtha, kerosene, diesel, vacuum gas oil (VGO), or combinations of these. The liquid hydrocarbon effluent 172 may include at least 90%, at least 95%, at least 98%, at least 99%, or even at least 99.5% of the hydrocarbon constituents from the liquid effluent 162. The liquid hydrocarbon effluent 172 may be passed to a downstream treatment processes for further conversion or separation. At least a portion of the liquid hydrocarbon effluent 172 may be passed back to the steam catalytic cracking reactor 130 for further conversion to olefins. The aqueous effluent 174 may include water and water soluble constituents from the liquid effluent 162. The aqueous effluent 174 may include some dissolved hydrocarbons soluble in the aqueous phase of the liquid effluent 162. The aqueous effluent 174 may include at least 95%, at least 98%, at least 99%, or even at least 99.5% of the water from the liquid effluent 162. The aqueous effluent 174 may be passed to one or more downstream processes for further treatment. In embodiments, at least a portion of the aqueous effluent 174 may be passed back to the steam catalytic cracking reactor 130 as at least a portion of the water 120 introduced to the steam catalytic cracking reactor 130.

In embodiments, the hierarchical mesoporous ZSM-5 zeolite produced by previously described processes may be used as a catalyst in a fluidized catalytic cracking (FCC) reactor. The FCC reactor may be a fluidized bed reactor. In the FCC reactor, the cracking catalyst consisting of the hierarchical mesoporous ZSM-5 zeolite may be contacted with the hydrocarbon feed, such as crude oil, in the presence of steam to produce light olefins, light aromatic compounds, or combinations of these. In embodiments, the cracking catalyst consists of the hierarchical mesoporous ZSM-5 zeolite. Suitable FCC processes for catalytically cracking crude oil in the presence of steam are disclosed in U.S. patent application Ser. No. 17/009,008, U.S. patent application Ser. No. 17/009,012, U.S. patent application Ser. No. 17/009,020, U.S. patent application Ser. No. 17/009,022, U.S. patent application Ser. No. 17/009,039, U.S. patent application Ser. No. 17/009,048, and U.S. patent application Ser. No. 17/009,073, all of which are incorporated by reference in their entireties in the present disclosure. The hydrocarbon feed can be any of the hydrocarbon feeds previously discussed in the present disclosure. The FCC reactor may be an upflow or a downflow FCC reactor. The FCC reactor system can include one or a plurality of FCC reactors, with one or a plurality of catalyst regenerators.

Figure 3:
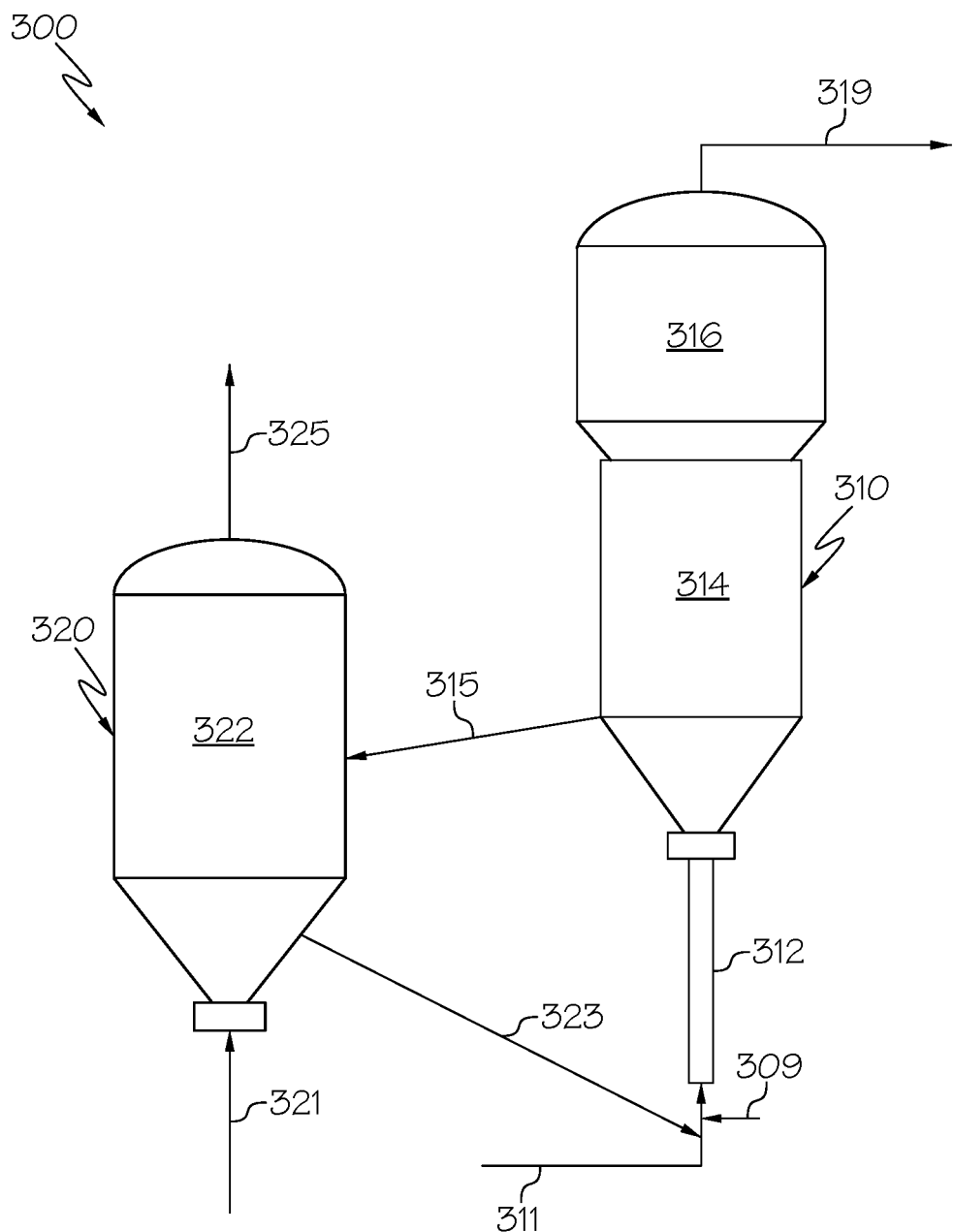
FIG. 3 schematically depicts an upflow fluidized catalytic cracking (FCC) system for upgrading a hydrocarbon feed through steam enhanced fluidized catalytic cracking, according to one or more embodiments shown and described in this disclosure.

Referring now to FIG. 3, one embodiment of an FCC reactor system 300 that includes a riser FCC reactor is schematically depicted. The FCC reactor system 300 may comprise an upflow FCC reactor 310 and a catalyst regeneration unit 320. As used in the present disclosure in the context of FIG. 3, the upflow FCC reactor 310 refers to the portion of the FCC reactor system 300 in which the major process reaction takes place, such as steam enhanced fluidized catalytic cracking to convert hydrocarbons to light olefins, aromatic compounds, or both. The upflow FCC reactor 310 can include a riser 312, a reaction zone 314 downstream of the riser 312, and a separation zone 316 downstream of the reaction zone 314. The FCC reactor system 300 can also include a regeneration zone 322 in the regeneration unit 320 for regenerating spent FCC catalyst.

In operation of the FCC reactor system 300 of FIG. 3, the hydrocarbon feed 311 is introduced to the riser 312. In embodiments, the hydrocarbon feed 311 may be combined with steam 309. The hydrocarbon feed 311 may be combined with an effective quantity of heated fresh or regenerated FCC catalyst in the riser 312. With respect to FIGS. 3 and 4, the term FCC catalyst refers to a cracking catalyst or a composite catalyst particle that includes the hierarchical mesoporous ZSM-5 zeolite impregnated with phosphorous compounds and transition metal compounds. The heated fresh or regenerated FCC catalyst particles may comprise the cracking catalyst of the present disclosure and may have any of the features, compositions, or properties previously described in the present disclosure for the cracking catalyst. The heated fresh or regenerated FCC catalyst particles can be conveyed via a conduit 323 from the regeneration zone 322 to the riser 312. The hydrocarbon feed 311, the steam 309, and the FCC catalyst particles are contacted in the riser 312 and passed upward through the riser 312 into the reaction zone 314. In the riser 312 and the reaction zone 314, the hydrocarbons from the hydrocarbon feed 311 are contacted with the steam 309 in the presence of the FCC catalyst particles at reaction conditions. Contact of the hydrocarbons from the hydrocarbon feed 311 with the steam 309 and the FCC catalyst at the reaction conditions may cause at least a portion of the hydrocarbons to undergo one or more chemical reactions to form upgraded hydrocarbons, which can include light aromatic compounds, light olefins such as but not limited to ethylene, propylene, mixed butenes, or combinations of these.

The reaction mixture comprising the spent FCC catalyst particles, reaction products, and unreacted hydrocarbons are passed to the separation zone 316 downstream of the reaction zone 314. In the separation zone 316, the reaction products and unreacted hydrocarbons are separated from the spent FCC catalyst particles using any suitable configuration known in the art. The reaction products, unreacted hydrocarbons, and other gases separated from the spent FCC catalyst particles can be withdrawn from the separation zone 316 via conduit 319. During the reaction, the cracking catalyst composition particles can become coked, and the coke deposits can reduce access to the active catalytic sites on the spent FCC catalyst particles. The spent FCC catalyst particles containing coke deposits from the reaction can be passed through conduit 315 to the regeneration zone 322 of the regenerator 320. In the regeneration zone 322 of the regenerator 320, the coked FCC catalyst particles may come into contact with a stream of oxygen-containing gas, which may enter the regeneration zone 322 via conduit 321. Contact with the oxygen-containing gas causes the coke deposits to undergo combustion, which removes the coke deposits from and heats the FCC catalyst particles. The hot regenerated FCC catalyst particles may be transferred from the regeneration zone 322 of the catalyst regeneration unit 320 via conduit 323 to the bottom portion of the riser 312 for admixture with the hydrocarbon feed 311.

Figure 4:
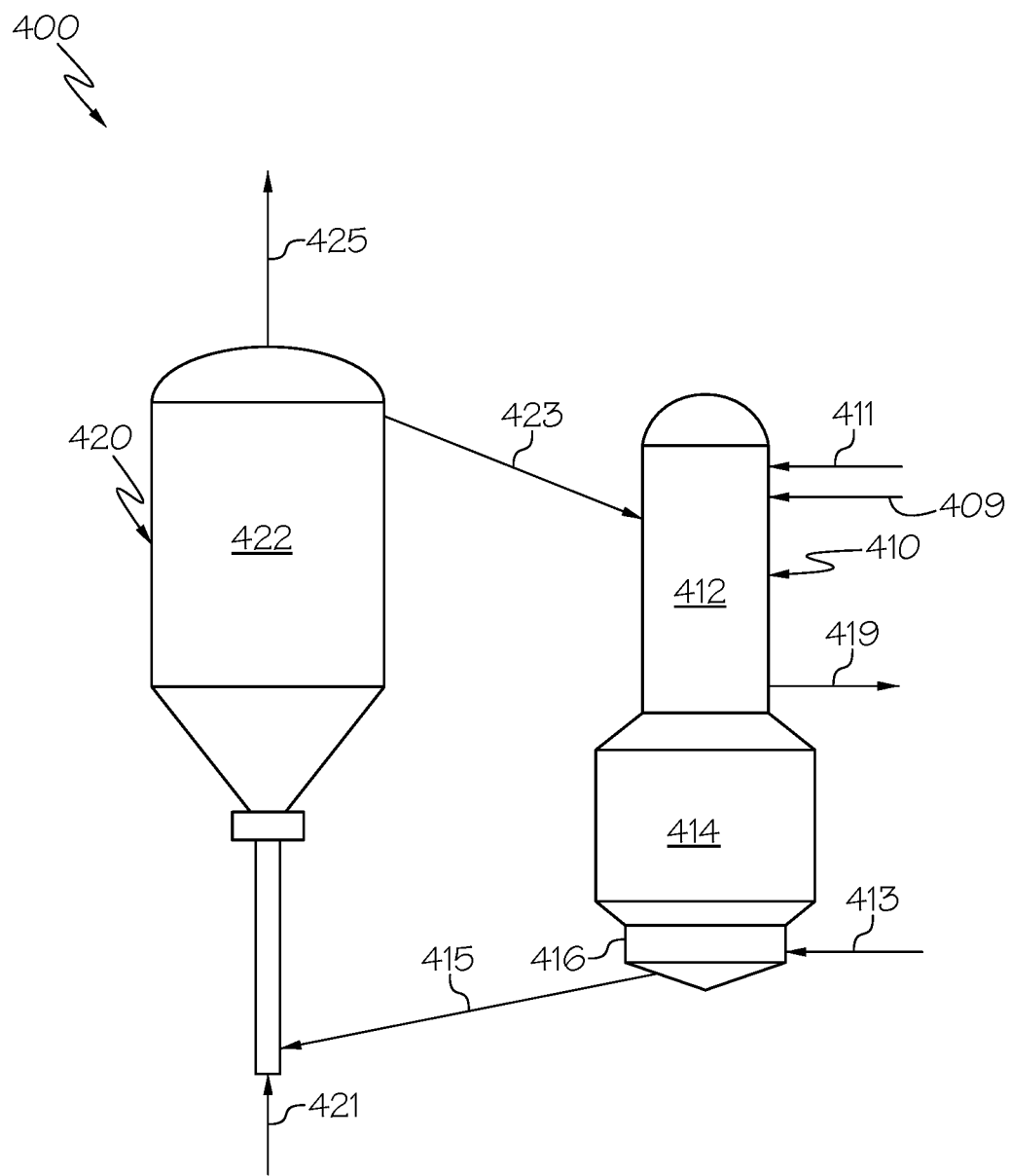
FIG. 4 schematically depicts a downflow fluidized catalytic cracking (FCC) system for upgrading a hydrocarbon feed through steam enhanced fluidized catalytic cracking, according to one or more embodiments shown and described in this disclosure.

Referring now to FIG. 4, another embodiment of an FCC reactor system 400 is schematically depicted. The FCC reactor system 400 may include a downflow FCC reactor 410 and a catalyst regeneration unit 420. The downflow FCC reactor 410 generally refers to the unit of the reactor system 400 in which the major process reaction takes place, such as steam enhanced fluidized catalytic cracking. The downflow FCC reactor 410 can include a reaction zone 412, a separation zone 414, and a stripper zone 416. The reactor system 400 of FIG. 4 may also include a regeneration zone 422 in the regeneration unit 420 for regenerating the spent catalyst.

The hydrocarbon feed 411 and steam 409 may be introduced to the reaction zone 412. The heated fresh or regenerated FCC catalyst particles may be conveyed from the regeneration zone 422 to the top of the reaction zone 412 through a downwardly directed conduit 423 to a hopper (not shown) at the top of the reaction zone 412. The flow of hot FCC catalyst particles may be allowed to stabilize in order to uniformly direct the FCC catalyst particles into the mix zone or feed injection portion of the reaction zone 412. The hydrocarbon feed 411 can be injected into a mixing zone at the top of the reaction zone 412 through feed injection nozzles typically situated proximate to the point of introduction of the regenerated FCC catalyst particles into reaction zone 412. The multiple injection nozzles can cause the FCC catalyst particles, hydrocarbon feed 411, and steam 409 to mix thoroughly and uniformly. Once the hydrocarbon feed 1 contacts the hot FCC catalyst particles, a catalytic reaction may begin.

The hydrocarbon feed 411, steam 409, and FCC catalyst particles may travel generally downwards through the reaction zone 412. At the end of the reaction zone 412, the reaction vapors (reaction products, unconverted hydrocarbon feed, and carrier gases) and spent FCC catalyst particles may pass into the separation zone 414 downstream of the reaction zone 412. In the separation zone 414, the spent FCC catalyst particles are separated from the reaction vapors, which include reaction products and unreacted hydrocarbons from the hydrocarbon feed 411. The reaction vapors can be directed through conduit 419 to various product recovery unit operations. The reaction temperature (which may be equivalent to the outlet temperature of the FCC unit 410) can be controlled by opening and closing a catalyst slide valve (not shown) that controls the flow of regenerated FCC catalyst particles from the regeneration zone 422 into the top of the reaction zone 412.

The spent FCC catalyst particles can be passed from the separation zone 414 to the stripper zone 416. In the stripper zone 416, a suitable stripping gas, such as steam, can be introduced through streamline 413. The stripping zone 416 can comprise a plurality of baffles or structured packing (not shown) over which downwardly flowing catalyst particles pass counter-currently relative to the stripping gas. The upwardly flowing stripping gas can strip or remove any additional hydrocarbons, such as reaction products or unreacted hydrocarbons from the feed, that remain in the pores of the spent FCC catalyst particles or between the FCC catalyst particles.

The spent FCC catalyst particles may be passed from the stripper zone 416 via conduit 415 to the catalyst regeneration unit 420. The spent FCC catalyst particles may be transported by lift forces from a combustion air stream 421 through a lift riser of the catalyst regeneration unit 420. The spent FCC catalyst particles may then be contacted with additional combustion air and subjected to controlled combustion in the regeneration zone 422 to remove coke deposits and heat the FCC catalyst particles to produce regenerated FCC catalyst particles. Flue gasses may be removed from the regeneration zone 422 via conduit 425. In the regenerator, the heat produced from the combustion of any coke by-product can be transferred to the FCC catalyst particles, which increases the temperature of the FCC catalyst to provide the heat required by the catalytic reactions in the reaction zone 412.

In embodiments, the FCC reactor may be operated at a reaction temperature of at least about 500° C., such as a reaction temperature of from 500° C. to 800° C., from 550° C. to 800° C., from 600° C. to 800° C., from 650° C. to 800° C., from 500° C. to 750° C., from 550° C. to 750° C., from 600° C. to 750° C., from 650° C. to 750° C., from 500° C. to 700° C., from 550° C. to 700° C., from 600° C. to 700° C., or from 650° C. to 700° C. Steam may be injected to the FCC reactor. The hydrocarbon feed may be catalytically cracked in the presence of the steam with the hierarchical mesoporous ZSM-5 zeolite. The steam to the hydrocarbon mass ratio in the FCC reactor may be from 0.2 to 0.8, from 0.3 to 0.8, from 0.4 to 0.8, from 0.5 to 0.8, from 0.2 to 0.7, from 0.3 to 0.7, from 0.4 to 0.7, from 0.5 to 0.7, from 0.2 to 0.6, from 0.3 to 0.6, from 0.4 to 0.6, or from 0.5 to 0.6. Steam may refer to all water in the FCC reactor. In embodiments, the residence time of the hydrocarbon feed and the steam in contact with the cracking catalyst in the FCC reactor may be from 1 second to 20 seconds, from 2 seconds to 20 seconds, from 5 seconds to 20 seconds, from 8 seconds to 20 seconds, from 1 second to 18 seconds, from 2 seconds to 18 seconds, from 5 seconds to 18 seconds, from 8 seconds to 18 seconds, from 1 second to 16 seconds, from 2 seconds to 16 seconds, from 5 seconds to 16 seconds, from 8 seconds to 16 seconds, from 1 second to 14 seconds, from 2 seconds to 14 seconds, from 5 seconds to 14 seconds, from 8 seconds to 14 seconds, from 1 second to 12 seconds, from 2 seconds to 12 seconds, from 5 seconds to 12 seconds, or from 8 seconds to 12 seconds. In embodiments, the cracking catalyst to hydrocarbon (catalyst to oil) weight ratio in the FCC reactor may be from 3 to 40, such as from 3 to 30, from 3 to 20, from 5 to 40, from 5 to 30, from 5 to 20, from 5 to 10, from 7 to 40, from 7 to 30, 7 to 20, from 7 to 10, from 10 to 40, from 10 to 30, from 10 to 20, or from 20 to 40. The cracking effluent from the FCC reactor can be separated into various product streams, intermediate streams, and an aqueous stream in a separation system downstream of the FCC reactor.

EXAMPLES

The various aspects of the present disclosure will be further clarified by the following examples. The examples are illustrative in nature and should not be understood to limit the subject matter of the present disclosure.

Examples 1-3: Synthesis of a Hierarchical Mesoporous ZSM-5 Zeolite

In Examples 1-3, the hierarchical mesoporous ZSM-5 zeolites of the present disclosure having different molar ratios of silica to alumina were prepared. To prepare the cracking catalyst, 7 grams of a starting preformed ZSM-5 zeolite was added to a glass reactor along with a sodium hydroxide (NaOH) solution in water and the surfactant cetyltrimethylammonium bromide (CTAB) to produce the first mixture. The concentration of CTAB in the first mixture was 4.45 wt. % based on the total weight of the first mixture (including the CTAB, NaOH, water, and the starting ZSM-5 zeolite). The starting ZSM-5 zeolites, the molar ratio of silica to alumina in each starting ZSM-5 zeolite, and the concentration of NaOH in the first mixture for each of Examples 1-3 are provided in Table 3.

TABLE 3

| Example | Zeolite Model | Zeolite Supplier | Silica to Alumina Molar Ratio | NaOH in First Mixture (M) |
|---|---|---|---|---|
| 1 | HSZ-840 NHA | Tosoh Europe BV | 40 | 0.20 |
| 2 | CBV-28014 | Zeolyst International | 28 | 0.40 |
| 3 | CBV-2314 | Zeolyst International | 23 | 0.40 |

For each of Examples 1-3, the starting preformed ZSM-5 zeolite was then disintegrated by gradually heating the first mixture comprising the ZSM-5 zeolite, NaOH, and CTAB to 100° C. and stirring the first mixture at 100° C. for a first hydrothermal treatment period of 24 hours. Following the first hydrothermal treatment, the hydrothermally treated mixture was then cooled down, and the pH was adjusted to 9.0 through addition of dilute sulfuric acid (2N (2 normality)) to produce a second mixture. The second mixture was then stirred for 24 hours and aged at 100° C. for another 24 hours. The solid product was filtered, washed thoroughly using distilled water, dried at 80° C. overnight, then calcined at 570° C. for 6 hours to remove the CTAB surfactant to produce the hierarchical mesoporous ZSM-5 zeolites of Examples 1-3. The hierarchical mesoporous ZSM-5 zeolites were each treated with 0.25 normality (N) ammonium nitrate twice at 80° C. for 5 hours to ion-exchange the hierarchical mesoporous ZSM-5 zeolite in the hydrogen form of the hierarchical mesoporous ZSM-5 zeolite.

Figure 5:
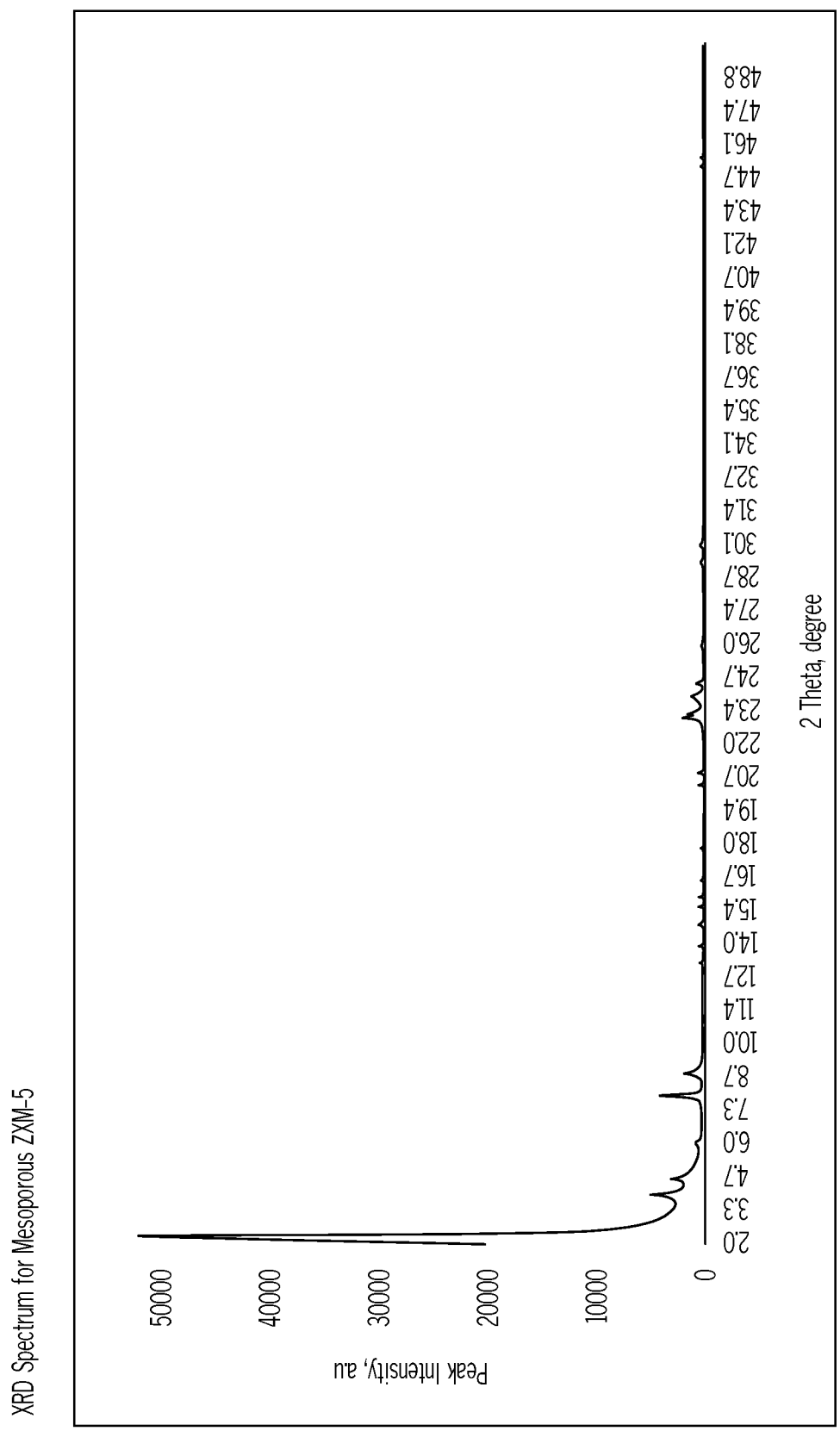
FIG. 5 graphically depicts an X-Ray Diffraction (XRD) spectrum for a hierarchical mesoporous ZSM-5 zeolite prior to impregnation with phosphorous and transition metal compounds to produce the cracking catalyst, according to one or more embodiments shown and described in the present disclosure.
Figure 6:
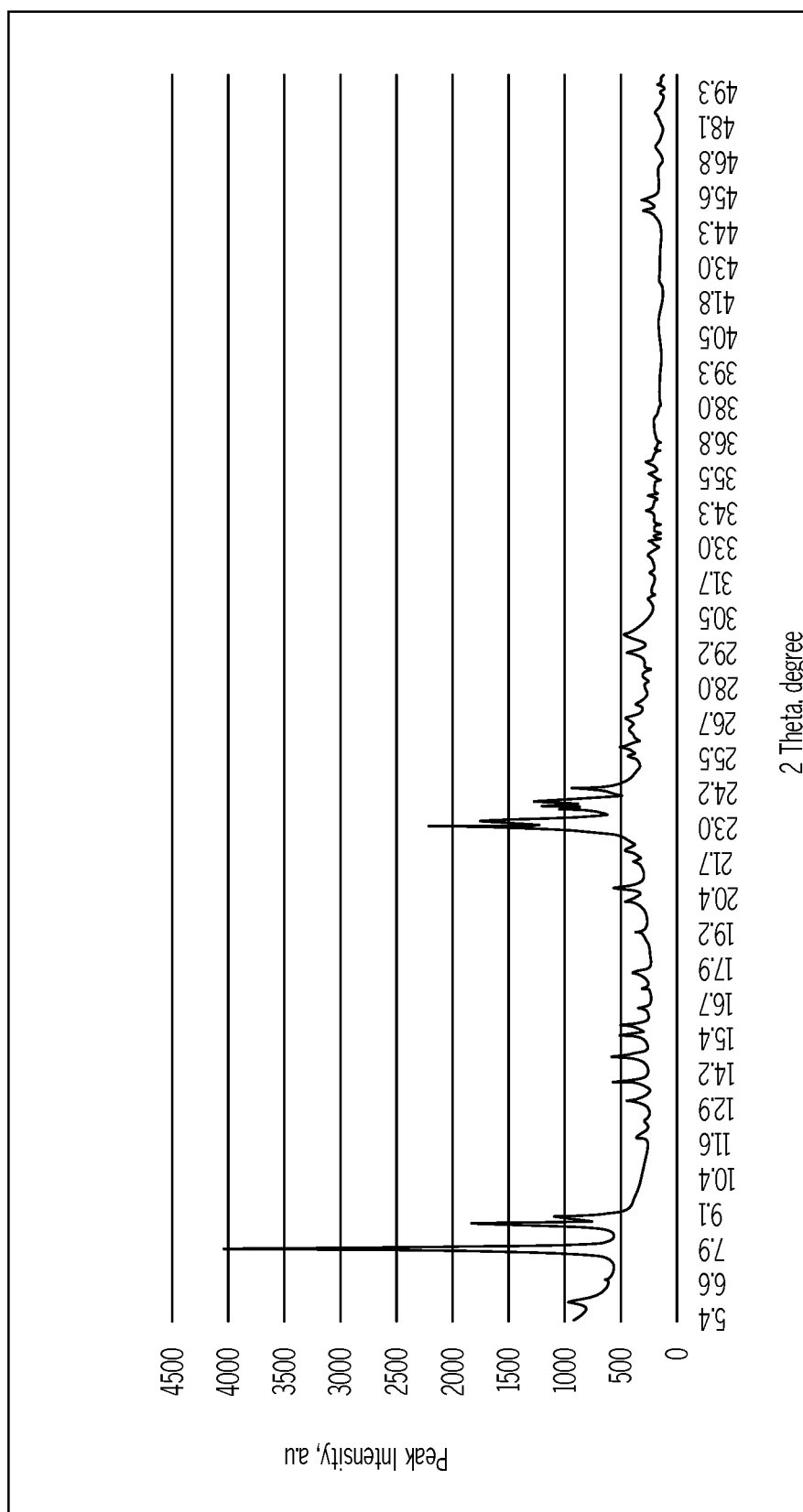
FIG. 6 graphically depicts a portion of the XRD spectrum of FIG. 5 over a wavelength range of from 5.4 nanometers to 49 nanometers, according to one or more embodiments shown and described in the present disclosure.

The hierarchical mesoporous ZSM-5 zeolite catalyst of Example 1 comprising a silica to alumina molar ratio of 40 was subjected to X-Ray Diffraction (XRD) according to known methods. Referring to FIGS. 5 and 6, graphically depicts the XRD spectra for the hierarchical mesoporous ZSM-5 zeolite of Example 1. The mesoporous phase is clearly established by the low angle peaks at theta ($\Theta$)=0.2 to $\Theta$=4.5, indicating the larger pore size of the mesoporous structure. FIG. 6 provides a zoomed in view of the portion of the XRD spectrum of FIG. 5 over the wavelength range of from 5.4 nm to 49 nm. Each of the hierarchical mesoporous ZSM-5 zeolites of Examples 1-3 had molar ratios of silica to alumina that were the same as the molar ratios of silica to alumina of the starting preformed ZSM-5 zeolites.

The BET surface area and total pore volume of the hierarchical mesoporous ZSM-5 zeolite of Example 1 were determined. The hierarchical mesoporous ZSM-5 zeolite of Example 1 had a total BET surface area of 572 $m^2/g$. The hierarchical mesoporous ZSM-5 zeolite of Example 1 was found to have a mesoporus BET surface area of 325 $m^2/g$, which is the portion BET surface area contributed by the mesopores. The microporous BET surface area of the hierarchical mesoporus ZSM-5 zeolite of Example 1 was found to be 247 $m^2/g$. The mesoporous BET surface area represented about 57% of the total BET surface area of the hierarchical mesoporous ZSM-5 zeolite of Example 1.

The hierarchical mesoporous ZSM-5 zeolite of Example 1 had a total pore volume of 0.45 $cm^3/g$, where the total pore volume was determined from measured gas adsorption isotherms through NLDFT modeling and analysis. The mesopore volume and micropore volume were also determined. The hierarchical mesoporous ZSM-5 zeolite of Example 1 was found to have a micropore volume of 0.14 $cm^3/g$ and a mesopore volume of 0.31 $cm^3/g$. The mesopore volume represented about 67% of the total pore volume of the hierarchical mesoporous ZSM-5 zeolite of Example 1.

Example 4: Preparation of the Cracking Catalyst

In Example 4, the cracking catalyst comprising the hierarchical mesoporous ZSM-5 zeolite of Example 2 (silica to alumina molar ratio of 28) impregnated with phosphorous oxide, cerium oxide, lanthanum oxide, and iron oxide was prepared. The hierarchical mesoporous ZSM-5 of Example 2, which had a molar ratio of silica to alumina of 28, was impregnated with phosphorus pentoxide and the transition metal oxides through wet impregnation. The phosphorous pentoxide was impregnated to a content of 3.5 wt. % of the $P_2O_5$ based on the total weight of the cracking catalyst. The cracking catalyst comprised 1 wt. % each of cerium oxide, lanthanum oxide, and iron oxide based on the total weight of the cracking catalyst. The cracking catalyst of Example 4 was prepared by wet impregnation followed by calcination to convert the transition metal precursors to the transition metal oxides.

Example 5: Preparation of Composite Catalyst Particles Comprising the Cracking Catalyst In Example 5, composite catalyst particles were prepared using the cracking catalyst of Example 4. The composite catalyst particles of Example 5 were prepared by blending 200 grams (dry basis) kaolin clay powder with 431.92 grams of de-ionized (DI water) to make a kaolin slurry. In a separate step, 200 grams (dry basis) of the cracking catalyst of Example 4 was made into a zeolite slurry with 462.59 grams of deionized water and stirred for 10 minutes. The zeolite slurry was added to the kaolin slurry and stirred for 5 minutes. Separately, a slurry of Catapal B alumina was prepared by mixing 100.0 grams (dry basis) with 194.92 grams of distilled water and peptized by adding 7.22 grams of concentrated formic acid (70 wt. %) and stirring for thirty minutes. The resulting peptized alumina slurry was added to the zeolite-kaolin slurry and blended for ten minutes producing a slurry with high viscosity where the individual particles remained suspended. The resulting slurry made up of about 30% solids was spray dried to produce catalyst particles having an average particle size of from 20 micrometers to 100 micrometers. The catalyst particles were then calcined at 550° C. to 6 hours to produce the composite catalyst particles of Example 5.

Comparative Example 6: UMIX 75 Commercial Cracking Catalyst

For Comparative Example 6, a commercial cracking catalyst was provided for comparison to the composite catalyst particles of Example 5. The commercial cracking catalyst of Comparative Example 6 was a mixture that included 75 wt. % of Equilibrium Catalyst (ECAT) and 25 wt. % of commercially available ZSM-5 zeolite (commercially available as OlefinsUltra® from W. R. Grace and Company) was prepared. The comparative commercial cracking catalyst may be referred to herein as "UMIX75". The commercial cracking catalyst of Comparative Example 6 did not include a hierarchical mesoporous ZSM-5 zeolite and did not include the combination of phosphorous pentoxide, cerium oxide, lanthanum oxide, and iron oxide impregnated onto the surfaces of the hierarchical mesoporous ZSM-5 zeolite.

Example 7: Cracking Catalyst Composition Evaluation

In Example 7, the composite catalyst particles of Example 5, which included the cracking catalyst of Example 4, and the commercial cracking catalyst of Comparative Example 6 were evaluated at atmospheric pressure in a fixed-bed reactor (FBR) system for steam catalytic cracking of AXL crude oil. The general make-up of the AXL crude oil, which was used as the hydrocarbon feed, is provided in Table 4. The cracked gaseous and liquid products were characterized by off-line gas chromatographic (GC) analysis using simulated distillation and naphtha analysis techniques.

Figure 7:
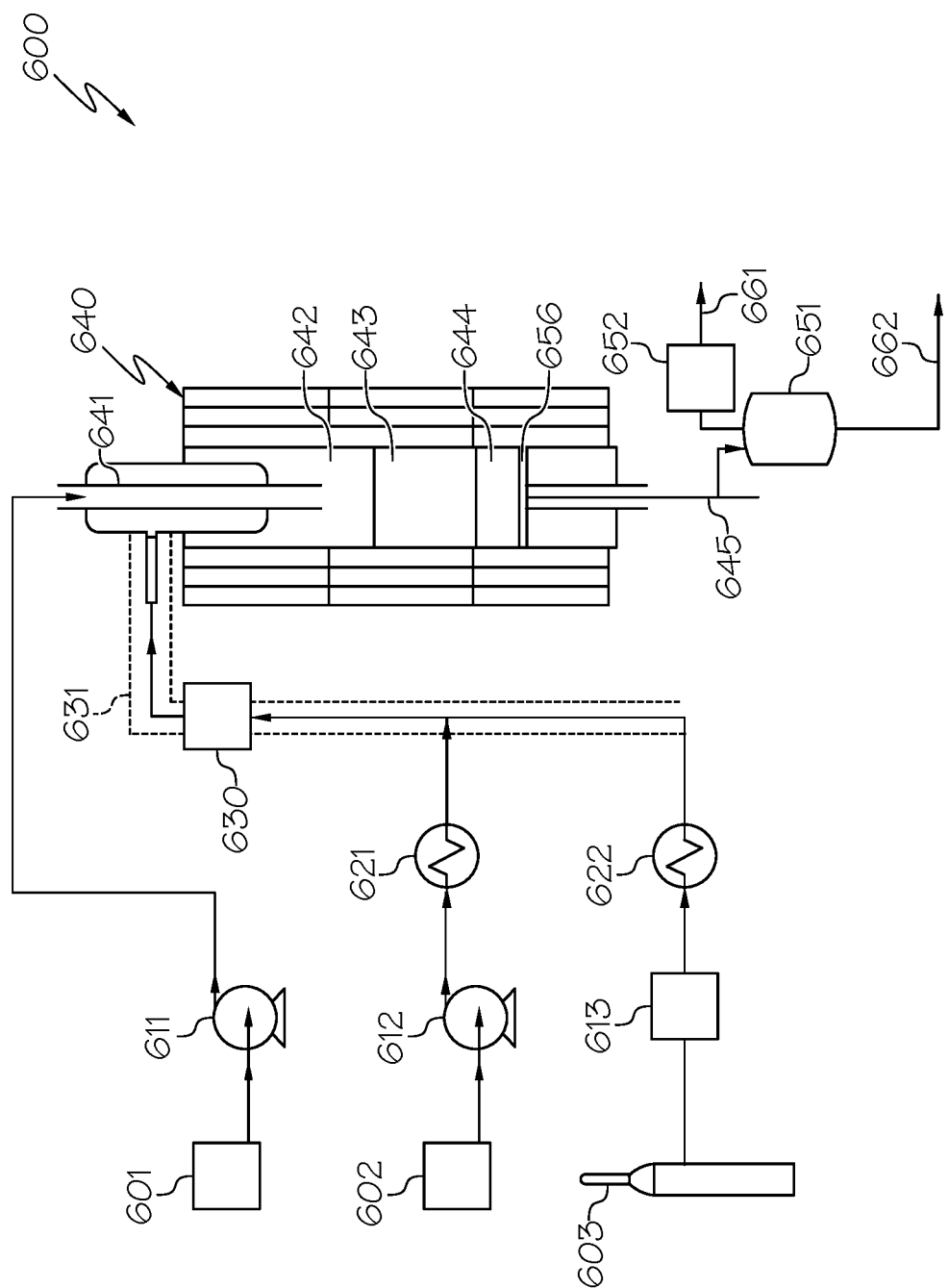
FIG. 7 schematically depicts a generalized flow diagram of a fixed bed reactor system for evaluating the cracking catalysts, according to one or more embodiments shown and described in the present disclosure.

Referring now to FIG. 7, the FBR system 600 for conducting the experiments of Example 7 is schematically depicted. AXL crude oil 601 was fed to a fixed-bed reactor 640 using a metering pump 611. A constant feed rate of 2 g/h of the AXL crude oil 601 was used. Water 602 was fed to the fixed bed reactor 640 using a metering pump 612. Water 602 was preheated using a preheater 621. A constant feed rate of 1 g/h of water 602 was used. Nitrogen 603 was used as a carrier gas at 65 mL/min. Nitrogen 603 was fed to the fixed bed reactor 640 using a Mass Flow Controller (MFC) 613. Nitrogen 603 was preheated using a preheater 622. Water 602 and Nitrogen 603 were mixed using a mixer 630 and the mixture was introduced to the fixed-bed reactor 640. Prior to entering the reactor tube, the AXL crude oil 601, water 602, and nitrogen 603 were preheated to 250° C. in the pre-heating zone 642. The pre-heating zone 642 was pre-heated using line heaters 631. The AXL crude oil 601 was introduced from the top of the reactor 640 through the injector 641 and mixed with steam in the top two-third of the reactor tube 640 before reaching the catalyst bed 644.

The catalyst bed 644 in the reactor tube 640 was moved a few centimeters down to allow more time for pre-heating of the AXL crude oil 601 prior to contacting with the catalyst in the catalyst bed 644. For each experiment, 1 gram (g) of catalyst (composite catalyst particles of Example 5 or commercial cracking catalyst of Comparative Example 6) having a mesh size of 30-40 was placed at the center of the reactor tube 640, supported by quartz wool 643, 646 and a reactor insert 645. Quartz wool 643, 646 was placed both at the bottom and top of the catalyst bed 644 to keep it in position. The height of the catalyst bed 644 was 1-2 cm. The composite catalyst particles of Example 5 and the comparative cracking catalyst of Comparative Example 6 were each used as the cracking catalyst in a different experiment conducted for Example 7. Prior to conducting the steam catalytic cracking reaction, each of the composite catalyst particles of Example 5 and the commercial cracking catalyst of Comparative Example 6 were steam deactivated in the presence of steam at a temperature of 810° C. for 6 hours.

Following steam deactivation, the hydrocarbon feed comprising the AXL crude oil and the water/steam were introduced to the reaction tube of the FBR. The reaction was allowed to take place for 45-60 min, until steady state was reached. The mass ratio of steam to crude oil was 0.5 grams of steam per gram of crude oil. The AXL crude oil was steam catalytically cracked at a cracking temperature of 675° C. and a weight ratio of catalyst to crude oil of 1:2. The residence time of the crude oil and the steam in the fixed bed reactor 640 was 10 seconds. The total time on stream for each individual experiment of Example 7 was 5 hours.

Referring again to FIG. 7, the cracking reaction product stream 645 was introduced to a gas-liquid separator 651 to separate the cracking reaction product stream 645 into cracked gaseous products 661 and liquid products 662. A Wet Test Meter 652 was placed downstream of the gas-liquid separator 651. The cracked gaseous products 661 and liquid products 662 were characterized by off-line gas chromatographic (GC) analysis using simulated distillation and naphtha analysis techniques. The reaction product streams from the cracking reaction were analyzed for yields of ethylene, propylene, and butylene. The yield analyses for Example 7 are graphically depicted in FIG. 8 and provided numerically in Table 4.

TABLE 4

| Stream | Feed - AXL Crude | Effluent | Effluent |
|---|---|---|---|
| Catalyst | — | Example 5 | Comparative Example 6 |
| Temperature (° C.) | — | 675 | 675 |
| Steam/Oil Weight Ratio | — | 0.5 | 0.5 |
| Residence Time (seconds) | — | 10 | 10 |
| Fuel Gas ($C_1$ & $H_2$) (wt. %) | — | 14.6 | 7.8 |
| Saturated $C_2$-$C_4$ (wt. %) | — | 6.6 | 4.0 |
| Ethylene (wt. %) | — | 23.0 | 17.0 |
| Propylene (wt. %) | — | 16.2 | 16.3 |
| Total Butenes (wt. %) | — | 6.6 | 9.9 |
| Naphtha (15° C.-221° C.) (wt. %) | 40.8 | 10.9 | 25.5 |
| Middle Distillate (221° C.-343° C.) (wt. %) | 26.3 | 8.3 | 10.5 |
| Heavy (343° C.+) (wt. %) | 32.9 | 5.7 | 5.1 |
| Coke (wt. %) | — | 8.2 | 3.7 |
| Total (wt. %) | 100 | 100 | 100 |
| Total Light Olefins (wt. %) | 0.0 | 45.8 | 43.2 |

Figure 8:
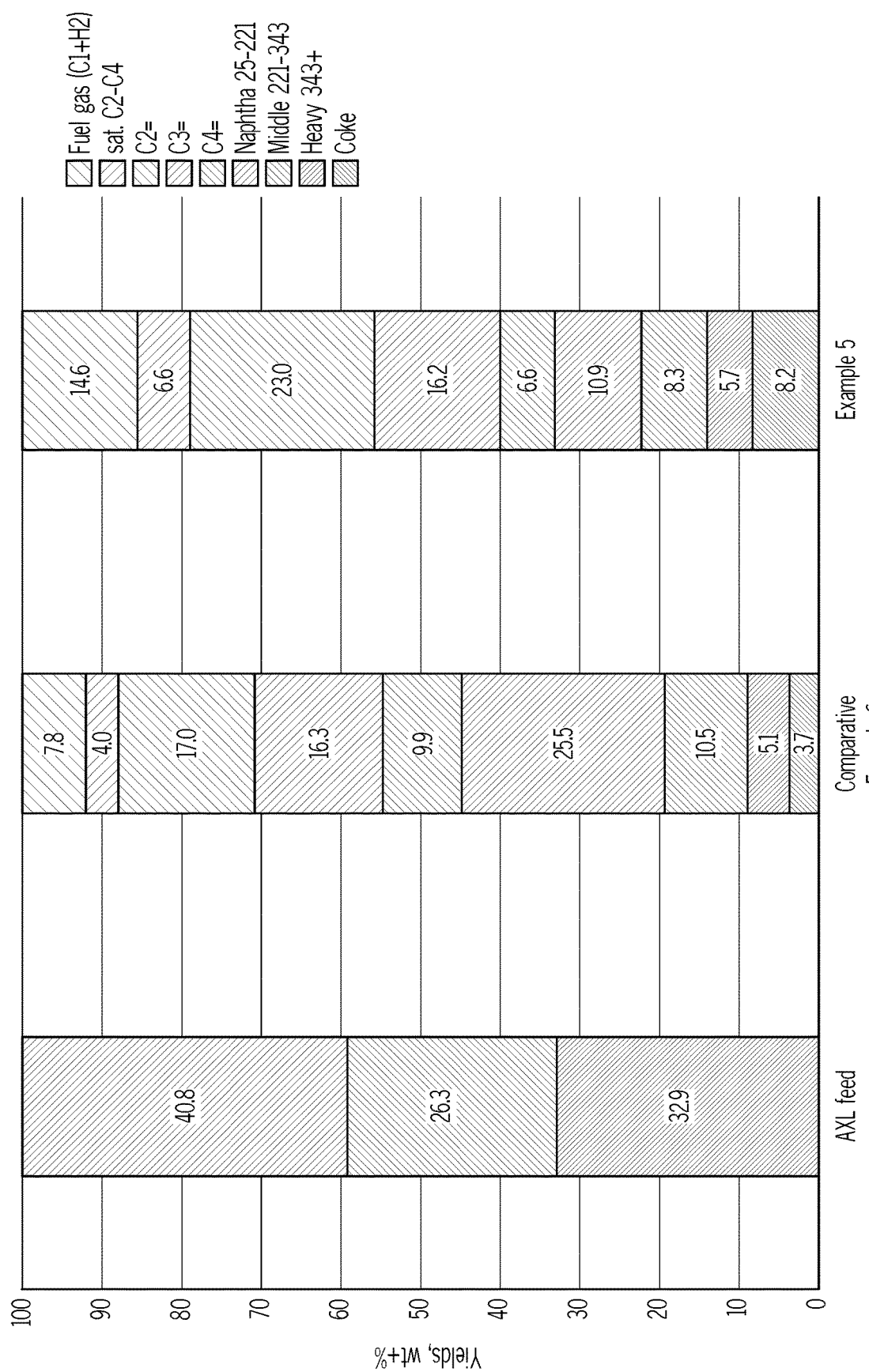
FIG. 8 graphically depicts product yields obtained from steam enhanced catalytic cracking an AXL crude oil with composite catalyst particles of Example 5 and the commercial catalyst of Comparative Example 6 in the fixed bed reactor system of FIG. 7, according to one or more embodiments shown and described in the present disclosure.

As shown by the results in Table 4 and in FIG. 8, the cracking catalyst of Example 5 comprising the hierarchical mesoporous ZSM-5 zeolite impregnated with $P_2O_5$, cerium oxide, lanthanum oxide, and iron oxide produced a greater yield of total light olefins (ethylene, propylene, and mixed butenes) compared to the commercially available cracking catalyst of Comparative Example 6. In particular, the cracking catalyst of Example 5 comprising the hierarchical mesoporous ZSM-5 zeolite impregnated with $P_2O_5$, cerium oxide, lanthanum oxide, and iron oxide produced a significantly greater yield of ethylene (23 wt. %) compared to the ethylene yield (17 wt. %) obtained using the commercially available cracking catalyst of Comparative Example 6. Thus, the cracking catalysts of the present disclosure comprising the hierarchical mesoporous ZSM-5 zeolite impregnated with $P_2O_5$, cerium oxide, lanthanum oxide, and iron oxide can provide greater yields of light olefins through steam enhanced catalytic cracking compared to the yields achievable with commercially available cracking catalysts.

A first aspect of the present disclosure may be directed to a process for upgrading crude oil through steam enhanced catalytic cracking. The process may comprise contacting the crude oil with steam in the presence of a cracking catalyst, where the cracking catalyst may comprise a hierarchical mesoporous ZSM-5 zeolite impregnated with phosphorous, cerium, lanthanum, and iron. A mass ratio of steam to crude oil may be from 0.2 to less than 1. Contacting of the crude oil with steam in the presence of the cracking catalyst may cause at least a portion of crude oil to undergo cracking reactions to produce a cracked effluent comprising light olefins, light aromatic compounds, or both.

A second aspect of the present disclosure may include the first aspect, where the phosphorous may be present in the cracking catalyst as phosphorous pentoxide, and the cracking catalyst may comprise from 1 wt. % to 5 wt. % phosphorus pentoxide based on the total weight of the cracking additive.

A third aspect of the present disclosure may include either one of the first or second aspects, where the cracking catalyst may comprise from 0.5 wt. % to 3 wt. % cerium oxide, from 0.5 wt. % to 3 wt. % lanthanum oxide, and from 0.5 wt. % to 3 wt. % iron oxide based on the total weight of the cracking catalyst.

A fourth aspect of the present disclosure may include any one of the first through third aspects, where the cracking catalyst may comprise from 1 wt. % to 5 wt. % phosphorus pentoxide, from 0.5 wt. % to 3 wt. % cerium oxide, from 0.5 wt. % to 3 wt. % lanthanum oxide, and from 0.5 wt. % to 3 wt. % iron oxide based on the total weight of the cracking catalyst.

A fifth aspect of the present disclosure may include any one of the first through fourth aspects, where the cracking catalyst may comprise 3.5 wt. % phosphorus pentoxide, 1 wt. % cerium oxide, 1 wt. % lanthanum oxide, and 1 wt. % iron oxide based on the total weight of the cracking catalyst.

A sixth aspect of the present disclosure may include any one of the first through fifth aspects, comprising contacting the crude oil with steam in the presence of a plurality of composite catalyst particles, where the plurality of composite catalyst particles may comprise the cracking catalyst, an inorganic binder, and a matrix material.

A seventh aspect of the present disclosure may include the sixth aspect, where the composite catalyst particles may comprise from 20 wt. % to 60 wt. % of the cracking catalyst, from 20 wt. % to 60 wt. % of the matrix materials, and from 15 wt. % to 60 wt. % inorganic binder based on the total weight of the composite catalyst particles.

An eighth aspect of the present disclosure may include either one of the sixth or seventh aspects, where the inorganic binder may comprise peptized alumina and the matrix material comprises kaolin clay.

A ninth aspect of the present disclosure may include any one of the first through eighth aspects, where the crude oil may have an American Petroleum Institute gravity of from 15 degrees to 50 degrees.

A tenth aspect of the present disclosure may include any one of the first through ninth aspects, where the crude oil may be a light crude oil, an extra light crude oil, a heavy crude oil, or combinations of these crude oils.

An eleventh aspect of the present disclosure may include any one of the first through tenth aspects, comprising contacting the crude oil with the steam in the presence of the cracking catalyst at a temperature of from 525° C. to 800° C.

A twelfth aspect of the present disclosure may include any one of the first through eleventh aspects, comprising contacting the crude oil with the steam in the presence of the cracking catalyst for a residence time of from 0.1 seconds to 60 seconds.

A thirteenth aspect of the present disclosure may include any one of the first through twelfth aspects, comprising contacting the crude oil with the steam in the presence of the cracking catalyst in a cracking reactor, where the cracking reactor may comprise one or more of fixed bed reactors, fluid bed reactors, batch reactors, fluid catalytic cracking (FCC) reactors, moving bed catalytic cracking reactors, or combinations of these.

A fourteenth aspect of the present disclosure may include any one of the first through thirteenth aspects, where the hierarchical mesoporous ZSM-5 zeolite may have a silica to alumina ratio of from 10 to 300.

A fifteenth aspect of the present disclosure may be directed to a cracking catalyst for steam enhanced catalytic cracking of hydrocarbons, the cracking catalyst comprising a hierarchical mesoporous ZSM-5 zeolite impregnated with phosphorous, cerium, lanthanum, and iron.

A sixteenth aspect of the present disclosure may include the fifteenth aspect, where the phosphorous may be present as phosphorous pentoxide and the cracking catalyst may comprise from 1 wt. % to 5 wt. % phosphorus pentoxide based on the total weight of the cracking catalyst.

A seventeenth aspect of the present disclosure may include either one of the fifteenth or sixteenth aspects, where the cracking catalyst may comprise from 0.5 wt. % to 3 wt. % cerium oxide, from 0.5 wt. % to 3 wt. % lanthanum oxide, and from 0.5 wt. % to 3 wt. % iron oxide based on the total weight of the cracking catalyst.

An eighteenth aspect of the present disclosure may include any one of the fifteenth through seventeenth aspects, where the cracking catalyst may comprise from 1 wt. % to 5 wt. % phosphorus pentoxide, from 0.5 wt. % to 3 wt. % cerium oxide, from 0.5 wt. % to 3 wt. % lanthanum oxide, and from 0.5 wt. % to 3 wt. % iron oxide based on the total weight of the cracking catalyst.

A nineteenth aspect of the present disclosure may include any one of the fifteenth through eighteenth aspects, where the cracking catalyst may comprise 3.5 wt. % phosphorus pentoxide, 1 wt. % cerium oxide, 1 wt. % lanthanum oxide, and 1 wt. % iron oxide based on the total weight of the cracking catalyst.

A twentieth aspect of the present disclosure may include any one of the fifteenth through nineteenth aspects, where the hierarchical mesoporous ZSM-5 zeolite may have a silica to alumina ratio of from 10 to 300.

A twenty-first aspect of the present disclosure may be directed to a process for preparing the cracking catalysts of any of the fifteenth through twentieth aspects, where the process may comprise providing a starting preformed ZSM-5 zeolite; disintegrating a portion of the starting preformed ZSM-5 zeolite in a first mixture comprising sodium hydroxide and a surfactant; after the at least partially disintegrating the starting preformed ZSM-5 zeolite, recrystallizing zeolite constituents in the presence of the surfactant to produce a recrystallized ZSM-5 zeolite having a hierarchical pore structure; recovering the recrystallized ZSM-5 zeolite; calcining the recrystallized ZSM-5 zeolite, where the calcining may remove the surfactant from the recrystallized ZSM-5 zeolite to produce the hierarchical mesoporous ZSM-5 zeolite; and impregnating the hierarchical mesoporous ZSM-5 zeolite with phosphorous, cerium, lanthanum, and iron to form the cracking catalyst.

A twenty-second aspect of the present disclosure may include the twenty-first aspect, further comprising, after the calcining, treating the hierarchical mesoporous ZSM-5 zeolite with 0.25 normality (N) ammonium nitrate twice at 80° C. for 5 hours to produce the hydrogen form of the hierarchical mesoporous ZSM-5 zeolite.

A twenty-third aspect of the present disclosure may include either one of the twenty-first or twenty-second aspects, where the disintegrating the portion of the starting preformed ZSM-5 zeolite may comprise combining the starting preformed ZSM-5 zeolite, the sodium hydroxide, and the surfactant to form the first mixture; heating the first mixture to a temperature of 100° C. while stirring; and maintaining the first mixture at the temperature of 100° C. and under stirring for a period of from 18 hours to 30 hours.

A twenty-fourth aspect of the present disclosure may include any one of the twenty-first through twenty-third aspects, where the recrystallizing the ZSM-5 zeolite constituents may comprise cooling the first mixture to a temperature of from 20° C. to 50° C.; adjusting a pH of the first mixture to 9.0 to produce a second mixture; stirring the second mixture for a second time period of 24 hours; and hydrothermally treating the second mixture by increasing the temperature to 100° C. and stirring for a third period of 24 hours. Stirring for the second time period and hydrothermally treating the second mixture for the third period may recrystallize the zeolite constituents in the presence of the surfactant to produce the recrystallized ZSM-5 zeolite.

A twenty-fifth aspect of the present disclosure may include any one of the twenty-first through twenty-fourth aspects, where the recovering the recrystallized ZSM-5 zeolite may comprise filtering the second mixture to produce a filtrate comprising the recrystallized ZSM-5 zeolite, washing the filtrate with distilled water, and drying the filtrate at 80° C. for a period of from 8 hours to 24 hours to produce the recrystallized ZSM-5 zeolite.

A twenty-sixth aspect of the present disclosure may include any one of the twenty-first through twenty-fifth aspects, comprising calcining the recrystallized ZSM-5 zeolite at a temperature of from 500° C. to 800° C. for a calcination period of from 4 hours to 24 hours.

A twenty-seventh aspect of the present disclosure may include any one of the twenty-first through twenty-sixth aspects, where the first mixture may comprise a concentration of sodium hydroxide of from 0.2 molar (M) to 0.5 M.

A twenty-eighth aspect of the present disclosure may include any one of the twenty-first through twenty-seventh aspects, where the surfactant may comprise cetyltrimethylammonium bromide (CTAB).

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A process for upgrading crude oil through steam enhanced catalytic cracking, the process comprising contacting the crude oil with steam in the presence of a cracking catalyst, where:

the cracking catalyst comprises a hierarchical mesoporous ZSM-5 zeolite impregnated with phosphorous, cerium, lanthanum, and iron;

a mass ratio of steam to crude oil is from 0.2 to less than 1; and where the contacting of the crude oil with steam in the presence of the cracking catalyst causes at least a portion of crude oil to undergo cracking reactions to produce a cracked effluent comprising light olefins, light aromatic compounds, or both.

2. The process of claim 1, where the phosphorous is present in the cracking catalyst as phosphorous pentoxide, and the cracking catalyst comprises from 1 wt. % to 5 wt. % phosphorus pentoxide based on the total weight of the cracking additive.

3. The process of claim 1, where the cracking catalyst comprises from 0.5 wt. % to 3 wt. % cerium oxide, from 0.5 wt. % to 3 wt. % lanthanum oxide, and from 0.5 wt. % to 3 wt. % iron oxide based on the total weight of the cracking catalyst.

4. The process of claim 1, comprising contacting the crude oil with steam in the presence of a plurality of composite catalyst particles, where the plurality of composite catalyst particles comprise the cracking catalyst, an inorganic binder, and a matrix material.

5. The process of claim 4, where the composite catalyst particles comprise from 20 wt. % to 60 wt. % of the cracking catalyst, from 20 wt. % to 60 wt. % of the matrix materials, and from 15 wt. % to 60 wt. % inorganic binder based on the total weight of the composite catalyst particles.

6. The process of claim 4, where the inorganic binder comprises peptized alumina and the matrix material comprises kaolin clay.

7. The process of claim 1, where the crude oil has an American Petroleum Institute gravity of from 15 degrees to 50 degrees.

8. The process of claim 1, where the crude oil is a light crude oil, an extra light crude oil, a heavy crude oil, or combinations of these crude oils.

9. The process of claim 1, comprising contacting the crude oil with the steam in the presence of the cracking catalyst at a temperature of from 525° C. to 800° C. and for a residence time of from 0.1 seconds to 60 seconds.

10. The process of claim 1, comprising contacting the crude oil with the steam in the presence of the cracking catalyst in a cracking reactor, where the cracking reactor comprises one or more of fixed bed reactors, fluid bed reactors, batch reactors, fluid catalytic cracking (FCC) reactors, moving bed catalytic cracking reactors, or combinations of these.

11. A cracking catalyst for steam enhanced catalytic cracking of hydrocarbons, the cracking catalyst comprising a hierarchical mesoporous ZSM-5 zeolite impregnated with phosphorous, cerium, lanthanum, and iron, wherein the hierarchical mesoporous ZSM-5 zeolite has a mesopore volume of from 0.25 $cm^3/g$ to 0.35 $cm^3/g$ prior to impregnation with the phosphorous, cerium, lanthanum, and iron.

12. The cracking catalyst of claim 11, where the phosphorous is present as phosphorous pentoxide and the cracking catalyst comprises from 1 wt. % to 5 wt. % phosphorus pentoxide based on the total weight of the cracking catalyst.

13. The cracking catalyst of claim 11, where the cracking catalyst comprises from 0.5 wt. % to 3 wt. % cerium oxide, from 0.5 wt. % to 3 wt. % lanthanum oxide, and from 0.5 wt. % to 3 wt. % iron oxide based on the total weight of the cracking catalyst.

14. The cracking catalyst of claim 11, where the cracking catalyst comprises from 1 wt. % to 5 wt. % phosphorus pentoxide, from 0.5 wt. % to 3 wt. % cerium oxide, from 0.5 wt. % to 3 wt. % lanthanum oxide, and from 0.5 wt. % to 3 wt. % iron oxide based on the total weight of the cracking catalyst.

15. A process for preparing the cracking catalyst of claim 11, the process comprising:
provinding a starting preformed ZSM-5 zeolite;
disintegrating a portion of the starting preformed ZSM-5 zeolite in a first mixture comprising sodium hydroxide and a surfactant;
after the at least partially disintegrating the starting preformed ZSM-5 zeolite, recrystallizing zeolite constituents in the presence of the surfactant to produce a recrystallized ZSM-5 zeolite having a hierarchical pore structure;
recovering the recrystallized ZSM-5 zeolite;
calcining the recrystallized ZSM-5 zeolite, where the calcining removes the surfactant from the recrystallized ZSM-5 zeolite to produce the hierarchical mesoporous ZSM-5 zeolite; and
impregnating the hierarchical mesoporous ZSM-5 zeolite with phosphorous, cerium, lanthanum, and iron to form the cracking catalyst.

16. The process of claim 15, further comprising, after the calcining, treating the hierarchical mesoporous ZSM-5 zeolite with 0.25 normality (N) ammonium nitrate twice at 80° C. for 5 hours to produce the hydrogen form of the hierarchical mesoporous ZSM-5 zeolite.

17. The process of claim 15, where the disintegrating the portion of the starting preformed ZSM-5 zeolite comprises:
combining the starting preformed ZSM-5 zeolite, the sodium hydroxide, and the surfactant to form the first mixture;
heating the first mixture to a temperature of 100° C. while stirring; and
maintaining the first mixture at the temperature of 100° C. and under stirring for a period of from 18 hours to 30 hours.

18. The method of claim 15, where the recrystallizing the ZSM-5 zeolite constituents comprises:
cooling the first mixture to a temperature of from 20° C. to 50° C.;
adjusting a pH of the first mixture to 9.0 to produce a second mixture;
stirring the second mixture for a second time period of 24 hours; and
hydrothermally treating the second mixture by increasing the temperature to 100° C. and stirring for a third period of 24 hours, where stirring for the second time period and hydrothermally treating the second mixture for the third period recrystallizes the zeolite constituents in the presence of the surfactant to produce the recrystallized ZSM-5 zeolite.

19. The process of claim 18, where the recovering the recrystallized ZSM-5 zeolite comprises:
filtering the second mixture to produce a filtrate comprising the recrystallized ZSM-5 zeolite;
washing the filtrate with distilled water; and
drying the filtrate at 80° C. for a period of from 8 hours to 24 hours to produce the recrystallized ZSM-5 zeolite.

20. The process of claim 15, where the surfactant comprises cetyltrimethylammonium bromide (CTAB).

* * * * *